(12) United States Patent
Dutta et al.

(10) Patent No.: US 10,679,636 B2
(45) Date of Patent: Jun. 9, 2020

(54) METHODS AND APPARATUS FOR SUPPORTING ENCODING, DECODING AND/OR TRANSCODING OF CONTENT STREAMS IN A COMMUNICATION SYSTEM

(71) Applicant: Ribbon Communications Operating Company, Inc., Westford, MA (US)

(72) Inventors: Biswanath Dutta, Bengaluru (IN);
Shivakumar Venkataraman, Bengaluru (IN); Sathish Pillim, Nuzvid (IN)

(73) Assignee: Ribbon Communications Operating Company, Inc., Westford, MA (US)

( * ) Notice: Subject to any disclaimer, the term of this patent is extended or adjusted under 35 U.S.C. 154(b) by 168 days.

(21) Appl. No.: 15/909,504

(22) Filed: Mar. 1, 2018

(65) Prior Publication Data
US 2019/0221223 A1    Jul. 18, 2019

(30) Foreign Application Priority Data

Jan. 12, 2018 (IN) .............................. 201841001392
Jan. 12, 2018 (IN) .............................. 201841001430

(51) Int. Cl.
| | |
|---|---|
| G10L 19/16 | (2013.01) |
| G10L 19/008 | (2013.01) |
| G06F 15/78 | (2006.01) |
| G06T 1/20 | (2006.01) |
| G06T 1/60 | (2006.01) |

(52) U.S. Cl.
CPC ........ *G10L 19/173* (2013.01); *G06F 15/7839* (2013.01); *G06T 1/20* (2013.01); *G06T 1/60* (2013.01); *G10L 19/008* (2013.01)

(58) Field of Classification Search
CPC ... G06T 1/20; G06T 2210/52; G06T 15/7839; G06T 1/60; G06F 3/1438; G09G 5/363; H04N 19/436; G10L 19/173; G10L 19/008
See application file for complete search history.

(56) References Cited

U.S. PATENT DOCUMENTS

| | | | |
|---|---|---|---|
| 2003/0091115 A1* | 5/2003 | Yamana | ............... H04N 5/4401 375/240.25 |
| 2011/0072177 A1 | 3/2011 | Glasco et al. | |
| 2013/0229422 A1 | 9/2013 | Harris et al. | |

(Continued)

*Primary Examiner* — Haixia Du
(74) *Attorney, Agent, or Firm* — Straub & Straub; Stephen T. Straub; Michael P. Straub

(57) ABSTRACT

Methods and systems for supporting parallel processing utilizing Central Processing Unit(s) (CPU(s)) and at least one Graphics Processing Unit (GPU) device to provide high scale processing of content streams. An exemplary method embodiment including the steps of: receiving at a CPU multiple data units corresponding to a first frame time for each of first through Nth content streams; sequentially processing by the CPU data units corresponding to different content streams and the first frame time; operating a set of cores of a GPU, in parallel, to perform processing on a set of data units, processing including operating each core of the set of cores to perform an operation on a data unit corresponding to a single one of the first plurality of content streams, each core in the set of cores processing a data unit of a different content stream, said processing generating a set of generated data units.

20 Claims, 8 Drawing Sheets

(56) References Cited

U.S. PATENT DOCUMENTS

| | | |
|---|---|---|
| 2018/0315154 A1 | 11/2018 | Park et al. |
| 2019/0166376 A1* | 5/2019 | Thomas ............... H04N 19/167 |
| 2019/0220949 A1 | 7/2019 | Dutta et al. |

* cited by examiner

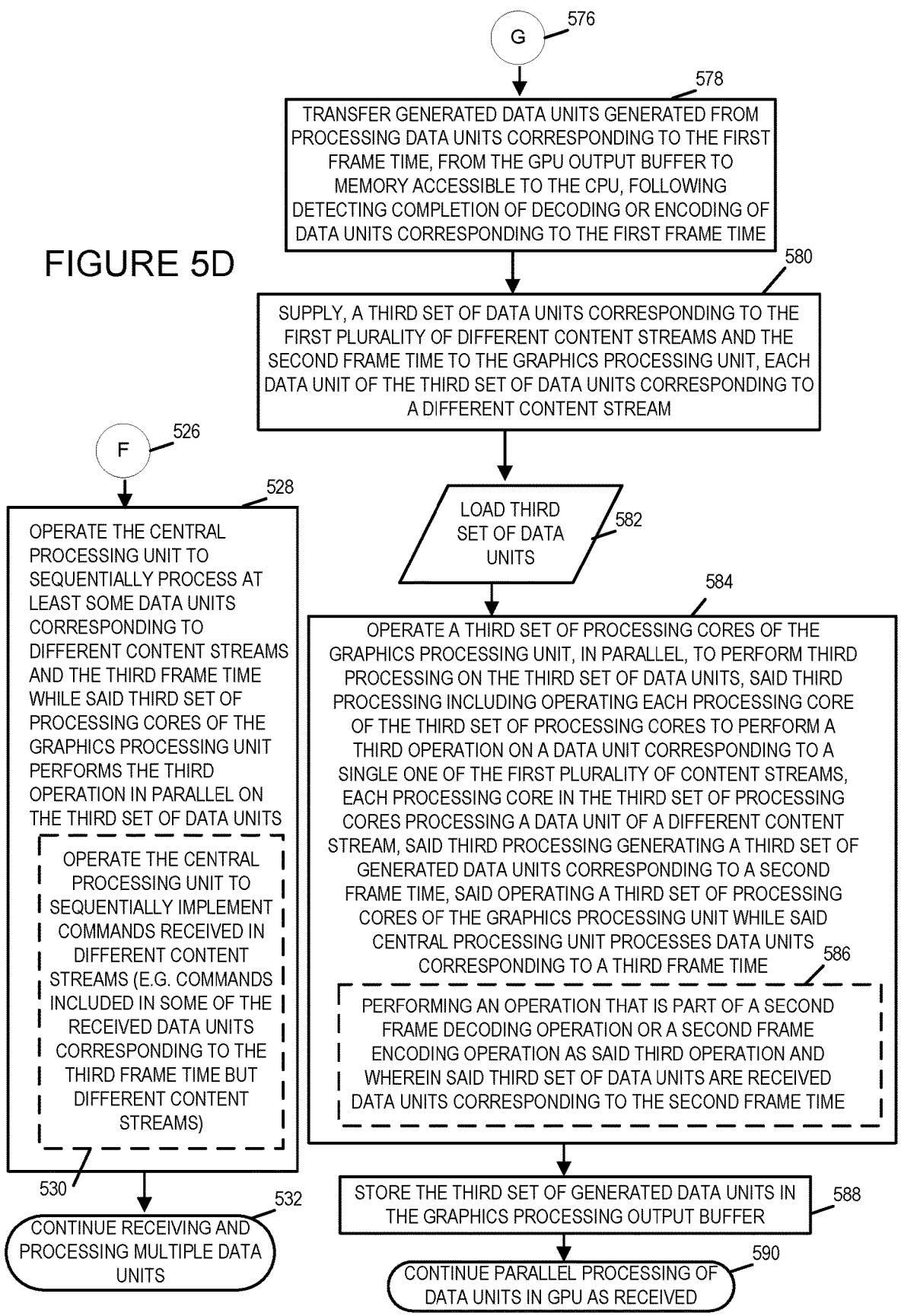

METHODS AND APPARATUS FOR SUPPORTING ENCODING, DECODING AND/OR TRANSCODING OF CONTENT STREAMS IN A COMMUNICATION SYSTEM

RELATED APPLICATIONS

The present application claims the benefit of the filing date of Indian Provisional Patent Applications S.N. 201841001392 filed on Jan. 12, 2018 and S.N. 201841001430 also filed on Jan. 12, 2018 each of which is hereby expressly incorporated by reference in its entirety.

FIELD OF INVENTION

The present invention relates to methods and apparatus for supporting parallel processing of content streams in a communications systems including for example encoding, decoding and transcoding processing of content streams. In particular the invention relates to communications methods and apparatus utilizing Central Processing Unit(s) (CPU(s)) and at least one Graphics Processing Unit (GPU) device to provide high scale encoding, decoding, and/or transcoding of content streams, e.g., real-time audio streams.

BACKGROUND

Network communications systems are often expected to support a large number of content streams in parallel. The content streams may, and often do, correspond to different voice sessions, e.g., calls. In some embodiments each voice session is communicated over a different channel which may be a virtual or physical channel. For purposes of encoding and decoding, data is often arranged into a set or unit corresponding to a frame time. Supporting of decoding and/or encoding operations for large numbers of communications sessions can be a resource intensive process particularly where real time communications sessions are involved since the decoding and/or encoding should be performed at a rate which allows the frame rate of the various communications sessions to be supported.

The processing of content steams and transcoding often involves at least some processing operations that do not easily lend themselves to parallel processing. While general purpose CPUs are well suited for serial processing operations, it can be costly to provide a CPU with processing power sufficient to process and sequentially transcode a large number of content streams in a single frame time. Increasing the number of CPUs, with each CPU supporting multiple content streams is one approach that may be taken to support the processing of large numbers of content streams. However, simply increasing the number of CPUs can be a costly proposition since CPUs capable of supporting large numbers content streams, e.g., voice calls, which are subject to coding and/or decoding can be expensive.

Graphics processing units (GPUs) have been developed for graphics applications, e.g., video operations. Such units often include a large number of processing cores often referred to as GPU cores. Each GPU core is capable of processing a unit of data in parallel with the other GPU cores. Thus, GPUs can support a large number of operations in parallel given that they have a large number of cores but the operations performed in parallel.

Because of the volume at which GPUs are produced, off the self GPU units tend to offer an excellent value in many cases for applications which lend themselves to parallel processing. Unfortunately, due to the sequential processing required for at least some portions of processing audio content streams, completely replacing regular CPUs with GPUs for purposes of processing and/or transcoding large numbers of audio content streams in a communications system is impractical in many cases given the time constraints in which the stream processing, e.g., audio decoding and/or encoding, needs to be performed, e.g., to support real time content streams such as those associated with voice calls that may involve transcoding.

In view of the above, it should be appreciated that there is a need for methods and/or apparatus which can be used to support processing of audio content streams, e.g., as part of communication through a communications network which supports real time audio communications.

For example, because of the high compute complexity of speech transcoding codecs, the scale achieved in Central Processing Unit (CPU) virtualized real-time speech transcoding service is limited. At the same time availability of Graphics Processing Units (GPUs) as a compute offload on Commercial Off The Shelf (COTS) hardware has increased given increasing demands from a diverse range of applications including Image Processing, Big Data, i.e., data sets that are so voluminous and complex that traditional data processing application software are inadequate to deal with them, and Artificial Intelligence. The ability to leverage GPUs as compute offloads for virtualized CPU based real-time speech transcoding services is an attractive use case. However, there are currently problems with using GPUs to provide speech transcoding services.

Speech transcoding operates on fixed frame sizes. Given a codec, a multi-channel speech transcoding system has to ensure processing of all channels is completed within the codec's frame-time for stability. CPU based solutions process channels sequentially and hence their scale is limited by the number of channels that could be processed in the codec's frame time. While GPUs which are equipped with thousands of compute cores (GPU cores), offer an attractive possibility of compute offload for scale, leveraging them for speech transcoding offload has a number of challenges. First, GPU compute cores are less powerful than CPU counterparts, hence they are ill-suited for sequential processing. Second, speech codecs employ various types of recursive filter algorithms making them difficult to be made parallel for GPU processing. Third, even if parts of the speech transcode processing could be offloaded to GPU, the increase in scale is limited by the fraction of processing that has been offloaded. For example, even if 50% of the transcode processing is offloaded from the CPU to a GPU a speed-up of only 2 times would be achieved. Fourth, parts of the speech transcoding services, like media-plane network telemetry and control plane communications require low-latency processing. Latency introduced by the GPU processing would affect such operations.

Offloading of encryption and/or decryption packet processing from a CPU to a GPU is another application to which the present invention is applicable.

From the aforementioned discussion, it is apparent that there is a need for new and/or improved communications methods and apparatus that are more efficient and cost effective and can provide and/or effectuate encrypting, decrypting, encoding, decoding and/or transcoding with greater efficiency when scaled. Furthermore, there is a need for new and/or improved methods and apparatus that can utilize one or more GPU devices to provide encrypting, decrypting, encoding, decoding, and/or transcoding services. There is a need for new and/or improved communications methods and apparatus that utilize common off the shelf GPU devices to provide lower cost encrypting, decrypting, encoding, decoding, and/or transcoding services on a per session basis than the alternative of using CPU devices alone without GPU devices.

SUMMARY

The present invention is directed to various features relating to communications methods, systems and apparatus. One or more embodiments of the present invention addresses one or more of the various technical problems described above and herein and improves upon the efficiency of encrypting, decrypting, encoding, decoding and/or transcoding of real-time content streams, e.g., audio streams using a combination of CPU and GPU devices.

In various embodiments, one or more CPUs (Central Processing Units) are used in combination with one or more GPUs (Graphical Processing Units) to support real time communication of content streams where the communication includes transcoding of at least some of the content streams. The content streams may be, and sometimes are, voice content streams corresponding to telephone or other audio calls which are made over different channels. Various features of the invention relate to a mechanism of organization of DSP (digital signal processing) speech codec context for concurrent processing of multiple codec channels at high scale on GPUs.

To support decoding, encoding and/or transcoding as part of communication of audio content streams, a CPU is used for performing some of the processing associated with the content stream while one or more GPUs are used to support at least some decoding, encoding and/or transcoding operations. The CPU in combination with one or more GPUs supports the communication, involving decoding, encoding and/or transcoding of multiple content streams.

While using a GPU to try and perform multiple operations in parallel as part of decoding and/or encoding a single content stream may be limited in its effectiveness given that the number of operations that can be performed in parallel on a single stream may be limited, by looking at the operations which must be performed to decode or encode multiple different content streams as a single problem, a GPU can be used to efficiently perform the same operation on data corresponding to different content streams in parallel. This approach can be used to scale processing associated with content streams, e.g., decoding and/or encoding multiple audio content streams, so that the multiple streams can be processed in parallel. In various embodiments a GPU including a plurality of cores is used to perform decoding operations and/or encoding operations on data corresponding to multiple different content streams in parallel. In some embodiments the content, e.g., data in RTP audio packets, corresponding to each content stream is allocated to a different processing thread with each GPU core handling the processing corresponding to a single thread and with multiple cores of a GPU being used to process multiple threads, e.g., audio streams, in parallel. The same operation may be performed, in parallel, by multiple GPU cores as part of a decoding or encoding operation on data corresponding to different data streams. In some embodiment each data stream is communicated on a channel corresponding to a voice call. Thus multiple voice calls in at least one exemplary audio embodiment are processed in parallel.

While decoding and/or encoding operations for multiple content streams may be performed in parallel using a GPU, in accordance with the invention operations which are better suited for sequential processing may be, and sometimes are, still performed by a CPU. In various embodiments a CPU receives and processes content streams corresponding to multiple different channels serially with data to be subject to decoding and/or encoding being loaded into a GPU for parallel processing.

By using a GPU to perform audio decoding and/or encoding the time taken for encoding and/or decoding the data corresponding to a frame time may be, and sometimes is, significantly higher than if the encoding and/or decoding were done completely on the CPU. However, because the GPU supports parallel operations, through the use of a large number of cores, for multiple streams higher scale is achieved by doing more channels in parallel than would occur on a normal CPU which sequentially processes content streams.

While, for the data for a given frame time, the CPU and GPU processing operations may be and normally are implemented sequentially, the CPU processing for data corresponding to different frame times may be, and sometimes is, performed in parallel with the GPU processing. Thus, while the CPU processes data for streams corresponding to one frame time, the GPU can process data corresponding to a different frame time. Such a pipelined processing approach allows for processing advantages.

Consider for example that given a high latency of GPU processing coupled with data dependency on CPU processing, e.g., to supply the data to be processed, it may not be feasible to perform CPU and GPU operations sequentially on a large number of streams within a time period required by a codec (coding/decoding specification) if both the CPU and GPU processing of all the streams needs to be completed in a single frame time before the processing of the data corresponding to the next frame time begins. However, by employing a pipelined approach in at least some but not necessarily all embodiments, GPU and CPU processing happen concurrently but in a time-sliced fashion with data corresponding to different time frames being performed in parallel by the CPU and GPU. Using such a pipeline approach, compliance with the timing requirements of an encoder and/or decoder can be achieved even when a large number of streams are being supported.

By splitting operations into separate sets of serial and parallel processing operations, the cost and parallel processing benefits available from using GPUs can be obtained while reducing the number of CPUs that are required to support a large number, e.g., thousands, of communications sessions involving decoding, encoding and/or transcoding in parallel. In this way benefits of GPUs can be taken advantage of to facilitate scaling of communications devices to support large numbers of concurrent calls without having to rely solely on fast expensive CPUs.

The present invention may be, and in some embodiment is, used to perform and/or provide cryptographic services including encryption and/or decryption of packets of real time content streams such as SRTP (Secure Real-time Transport Protocol) packets in parallel in a GPU, i.e. offloading the encryption and/or encryption processing for a plurality of real time packet streams from a CPU to a GPU device. In such embodiments involving encrypting and/or decrypting, similar to the encoding, decoding, and transcoding examples, the GPU is used to process a large number of concurrent packet streams in parallel to take advantage of the benefits of the GPU which facilitate scaling of communications devices to support encryption and/or decryption services on large numbers of concurrent real time packet streams, e.g., calls, without having to rely solely on fast expensive CPUs.

One exemplary embodiment of the invention includes a communications method, the method comprising the steps of: receiving, at a central processing unit (CPU), multiple data units corresponding to a first frame time for each of first through Nth content streams; operating the central processing unit to sequentially process at least some data units corresponding to different content streams and the first frame time; supplying, a first set of data units corresponding to a first plurality of different content streams to a graphics processing unit, each data unit of the first set of data units corresponding to a different content stream; operating a first set of cores of the graphics processing unit, in parallel, to perform first processing on the first set of data units, said first processing operating each core of the first set of cores to perform a first operation on a data unit corresponding to a single one of the first plurality of content streams, each core in the first set of cores processing a data unit of a different content stream, said first processing generating a first set of generated data units; and storing the first set of generated data units in a graphic processing unit (GPU) output buffer.

In some embodiments, the multiple data units corresponding to the first frame time are received by the CPU sequentially, on a per stream basis.

In some embodiments, the multiple data units corresponding to the first frame time are received by the CPU from memory (e.g., RAM coupled to the CPU) with multiple data units (e.g., packetized data) corresponding to a first content stream and said first frame time being received by said CPU prior to multiple data units (e.g., packetized data) corresponding to a second content stream and said first frame time.

In some embodiments, the method further comprises operating said graphic processing unit to perform sequential parallel processing on different sets of data units corresponding to the first frame time, each sequentially processed set of data units including one data unit from each of said first plurality of different content streams.

In some embodiments, the first operation is an operation performed as part of a first frame decoding operation or a first frame encoding operation, and the first set of data units are received data units corresponding to the first frame time.

The invention is also applicable to systems and apparatus that implement the steps of the various method embodiments.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 5 comprises the combination of FIGS. 5A, 5B, 5C and 5D.

FIG. 5D illustrates a fourth part of a flowchart of an exemplary method in accordance with an embodiment of the present invention.

DETAILED DESCRIPTION

Figure 1:
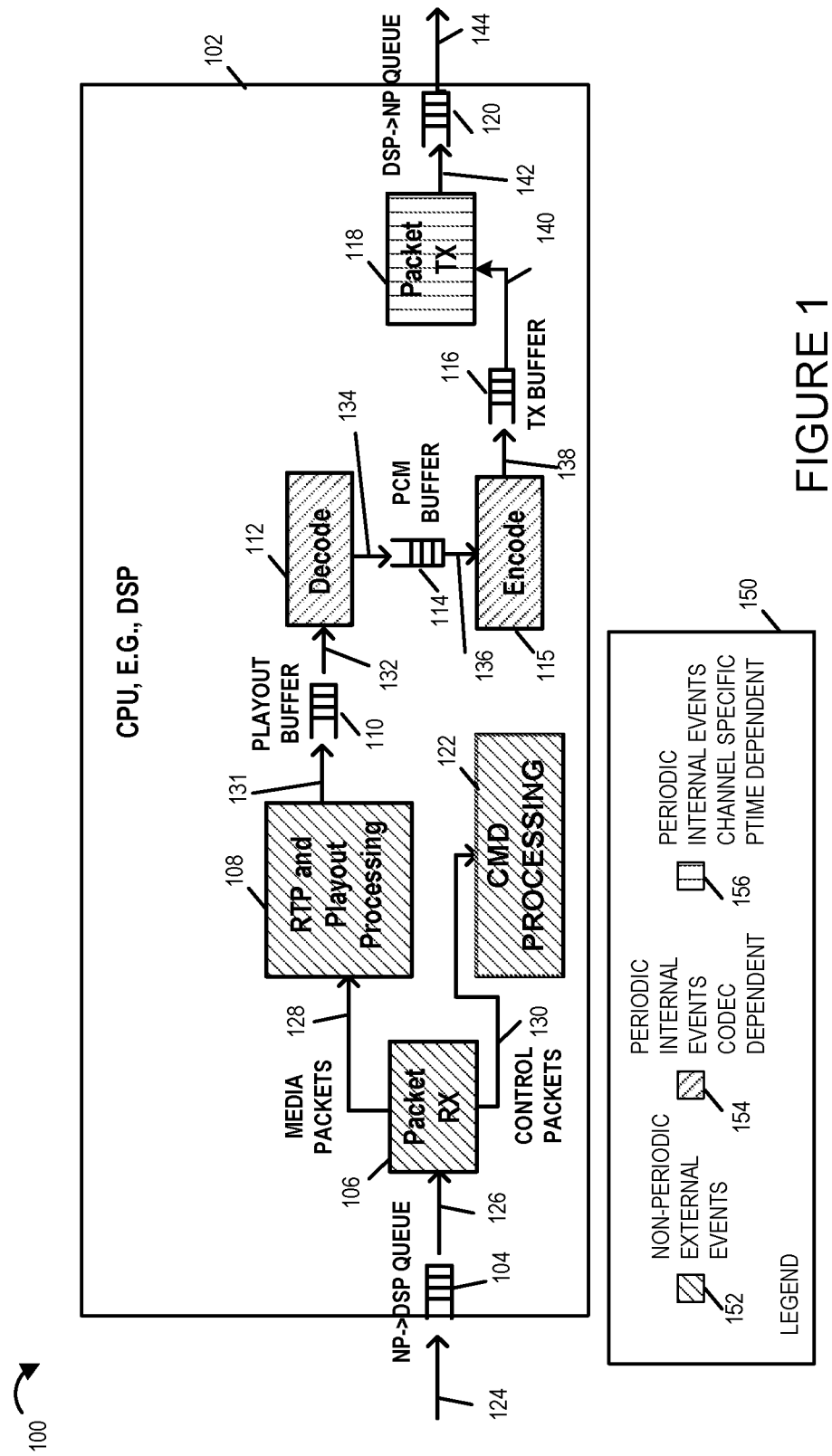
FIG. 1 illustrates the processing flow of an exemplary speech transcoding system implemented on a central processing unit.

Diagram 100 of FIG. 1 illustrates the processing flow of a typical real-time speech transcoding system implemented on a central processing unit, e.g., digital signal processing (DSP) hardware device. The CPU 102 includes a network processor to CPU/DSP input queue 104, a packet receiver component 106, a Real-time Transport Protocol (RTP) and Playout processing component 108, a playout buffer 110, a decode component 112, a pulse code modulation (PCM) buffer 114, an encode component 115, a transmitter buffer 116, a packet transmitter 118, a CPU/DSP to network processor output queue 120, a command processing component 122, and communications links and/or communications bus connecting the various components. One or more of the queues 104 and 120 and/or the buffers 110, 114, and 116 may be, and in some embodiments are, cache memory in the CPU 102. In some embodiments, one or more of the queues 104 and 120 and/or the buffers 110, 114, and 116 are not included in the CPU but are included in external random access memory accessible to the CPU. The arrows 124, 126, 128, 130, 131, 132, 134, 136, 138, 140, 142, and 144 indicate the flow packets and/or data between components.

FIG. 1 shows packet stream processing which may be, and sometimes is, performed as part of sequentially processing one or more content streams, e.g., audio streams, whose packets are received sequentially, e.g., with packets for a first content stream and first frame time being received and processed followed by packets for a second content stream and the first frame time. After packets for different streams corresponding to a first frame time are received, processing of packets corresponding to the next frame time may begin.

For purposes of explaining the processing, processing of packets corresponding to a first content stream and first frame time will now be explained with the understanding that similar processing is used for the other content streams.

Packets, e.g., of the first content stream are received by the CPU via input memory queue 104. For example, the input memory queue 104 may, and in some embodiments does, receive packets from a network processor external to the CPU 102 which interfaces to and receives packets from a communications network. The network processor may for example be included in a Session Border Controller (SBC) that performs transcoding services for content streams, e.g., Real-time Transport Protocol streams, which are anchored at the SBC. The input memory queue 104 may be included in the cache of the CPU in some embodiments. In some embodiments, the input memory queue is included in Random Access Memory (RAM) external to the CPU 102. Packets 124 of the packet stream which are inputted into the input queue are retrieved from the input queue 104 serially and outputted as shown by arrow 126 to the packet receiver component 106. The packet receiver component 106 processes and analyzes the packet. As part of processing and analyzing the packet, the packet receiver component 106 enforces packet sequencing for the packet stream. The packet receiver component 106 also, as part of processing and analyzing the received packets, determines whether each received packet is a media packet or a control packet. As illustrated by arrows 128 and 130 respectively, when the packet receiver component 106 determines that a received packet is a media packet, it communicates the media packet to the Real-time Transport Protocol (RTP) and Playout Processing component 108, and when the packet receiver component 106 determines that a received packet is a control packet, e.g., a Real-time Transport Control Protocol packet, the packet receiver component 106 communicates the control packet to the command processing component 122. The command processing component 122 performs operations based on the received commands in the received control packets. The RTP and playout processing component 108 processes the RTP packets (e.g., audio packets), and outputs the encoded data from the received RTP packets of the packet stream to the playout buffer 110 as shown by arrow 131. The RTP and Playout processing component 108 removes dither and arranges the data according to the timestamps included in the received packets so the data is outputted in the correct sequence for playback. As previously explained the playout buffer 110 may be implemented in cache in the CPU or in RAM memory external to the CPU. Arrow 132 shows that the encoded data in the playout buffer 110 is sent to the decode component 112 which performs a decoding operation on the encoded data. Arrow 134 shows that the decoded data which is now in pulse code modulation (PCM) format, i.e., as uncompressed media, is outputted to a PCM buffer 114. The PCM buffer 114 as previously discussed may implemented in cache on the CPU or in RAM external to the CPU. As illustrated by arrow 136 the data in PCM format is outputted from the PCM buffer 114 to the encode component 115 which encodes the data generating encoded data. As the system is a transcoding system, the decoding component would have performed decoding of the received packet data from a first format, e.g., G729AB codec format, and the encoding component 115 would have encoded the decoded packet data into a different codec format, e.g., G711 codec format. Arrow 138 shows that once the data has been encoded, the encoded data is outputted to transmit buffer 116. Transmit buffer 116 may be, and in some embodiments is, cache memory included in the CPU while in other embodiments, it is RAM memory external to the CPU. Arrow 140 shows that the encoded data is passed from transmit buffer 116 to the packet transmitter 118. The packet transmitter 118 receives the encoded data from the transmitter buffer 116 packetizes it and send the packets containing the encoded data to the output queue 120 as shown by arrow 142. The packets are then pulled or taken from the output queue 120 by a network processor which transmits them toward their intended recipient. The output queue 120 as previously explained may be cache memory in the CPU 102 or RAM memory external to the CPU 102. The arrow 144 shows the packets of the content stream which include the transcoded data, e.g., audio, being outputted from the output queue 120. This is a typically transcoding system wherein the CPU, e.g., DSP performs the transcoding in a sequential manner. The components may be, and in some embodiments are, hardware components, software components, and/or a combination of hardware and software components. The hardware components may be implemented as dedicated hardware circuitry. In some embodiments, the components are software components implemented as software instructions executed in a CPU processing core. E.g., the decode and encode components may be, and typically are, software components executed in a CPU processing core.

The components 106, 108, 112, 115, 118 and 122 have been classified according to their temporal periodicity into three categories. Box 150 is a legend showing the three categories. The first category 152 is non-periodic external events. The packet receiver component 106, RTP and Playout processing component 108, and command processing component 122 are included in the first category for the reasons discussed below. The second category 154 is periodic internal events which are codec dependent. The decode component 112 and encode component 115 are included in the second category for the reasons discussed below. And, the third category 156 is periodic channel specific internal events dependent on network packetization time (ptime). A channel is a single independent content stream, e.g., audio stream. The packet transmitter component 118 is included in the third category for the reasons discussed below.

Tasks that depend on non-periodic external events require low latency response, hence they are best suited to be kept in the CPU device itself. Packetization and transmission are periodic tasks, however the period may vary from channel to channel based on the packetization time. Such tasks are also best suited to be kept in the CPU. Compute intensive periodic tasks such as for example, encode and decode occur at fixed periods (based on the codec). The encode and decode operations which are compute intensive periodic tasks have been identified as targets for offloading from the CPU to the GPU.

Elements in other figures with the same reference numbers are used to refer to the same or similar elements and thus will not be described in detail again.

Figure 2:
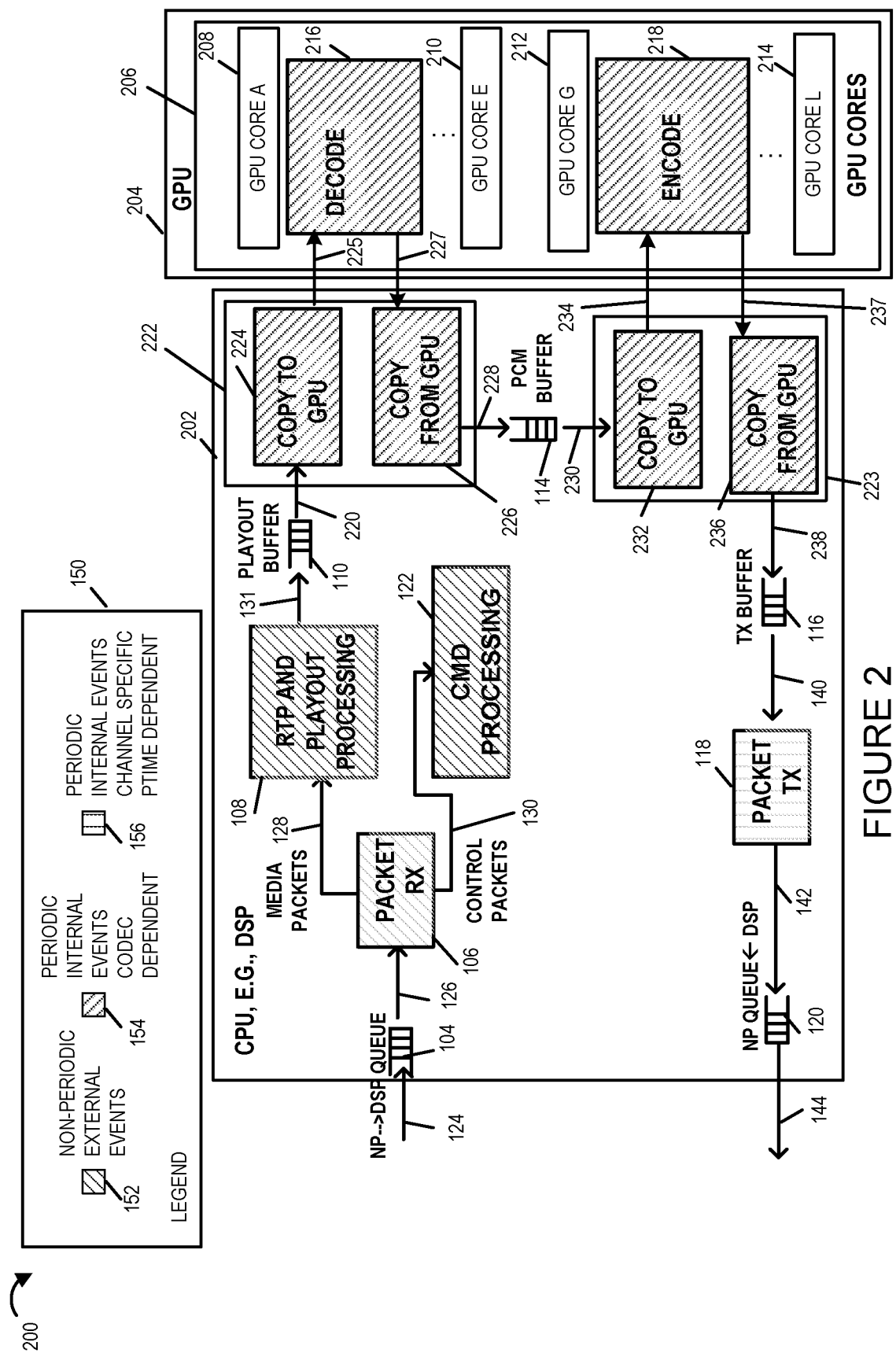
FIG. 2 illustrates the processing flow of an exemplary speech transcoding system implemented on a central processing unit and graphics processing unit in accordance with an embodiment of the present invention.

Diagram 200 of FIG. 2 illustrates the processing flow of a real-time speech transcoding system implemented in accordance with an exemplary embodiment of the present invention. In the processing flow diagram 200 of FIG. 2, the CPU 202 includes many of the same elements as the CPU 102 of FIG. 1 which perform the same or similar functions as described in connection with the transcoding system illustrated in FIG. 1 which will not be discussed again.

In the transcoding system of FIG. 2, the decoding function/operations and encoding function/operations have been offloaded from the CPU 202 to the GPU 204. GPU 204 includes GPU cores 206. GPU cores 206 includes a plurality of GPU cores including GPU processing core A 208, . . . , GPU processing core E 210, GPU processing core G 212, . . . , GPU processing core L 214. The CPU 202 includes control input/output interface components 222 and 223. Packets for a plurality of content streams, e.g., RTP packets streams are received by the packet receiver 106 of the CPU 202 from the input queue 104 as previously described. The packets are processes by the packet receiver component 106, RTP and Playout processing component 108, and command processing component 122 as previously described with the result being encoded data for a plurality of streams/channels being stored in the playout buffer 110. Arrows 220 and 225 show that the encoded data from the playout buffer 110 is outputted from the CPU 202 by the copy to GPU sub-component 224 of control input/output interface component 222 to a plurality of GPU processing cores, GPU Core A 208 . . . GPU Core E 210. The outputted data is for a plurality of channels/content streams (e.g., RTP audio streams) which the GPU Cores will process in parallel. The GPU cores A 208, . . . , E 210 decode the outputted data from the playback buffer and generate data in PCM format, i.e., uncompressed data for a plurality of channels, i.e. stream. As arrows 227 and 228 indicate, the decoded data is copied from the GPU cores A 208, . . . , E 210 to the PCM buffer 114 by the copy from GPU sub-component 226 of control input/output interface component 222.

The uncompressed media data is copied from the PCM buffer 114 to a plurality of GPU processing cores including GPU processing core G 212, . . . , GPU processing core L 214 of GPU 204 by the copy to GPU sub-component 232 of control input/output interface component 233 as shown by arrows 230 and 234. The PCM data that is copied to the GPU processing cores G 212, . . . , L 214 includes data for a plurality of channels, i.e. streams. While the GPU processing cores of the GPU 204 that perform the decoding function/operation 216 are shown as being different from the GPU processing cores that perform the encoding function/operation 218, one or more of the GPU processing cores that perform the encoding operation/function which is happening at a later time then the decoding operation may be the same as the GPU cores that performed the decoding operation. The specific GPU cores selected to the perform the encoding and decoding operation is not critical to implementation of the invention.

Once the data for the plurality of channels, i.e., content streams, has been completed, the copy from GPU component 236 of control input/output interface component 223 copies the encoded data from the GPU 204 to transmit buffer 116 as indicated by arrows 237 and 238. The packet transmitter 118 receives/obtains the encoded data from the transmitter buffer 116, packetizes the encoded data, and outputs the packets including the encoded data to the output queue 120 as previously described in connection with FIG. 1.

While the time to perform the encoding or decoding operation of a frame on a GPU is significantly higher than on the CPU, higher scale is achieved by doing more channels (i.e. content streams) in parallel. Given the high latency of GPU processing coupled with data dependency on CPU processing, it is not currently feasible to perform CPU and GPU operations sequentially on a single frame within the codec's frame time. To address this problem, a pipeline approach is used where GPU and CPU processing happen concurrently but in a time-shifted or time-sliced fashion.

Figure 3:
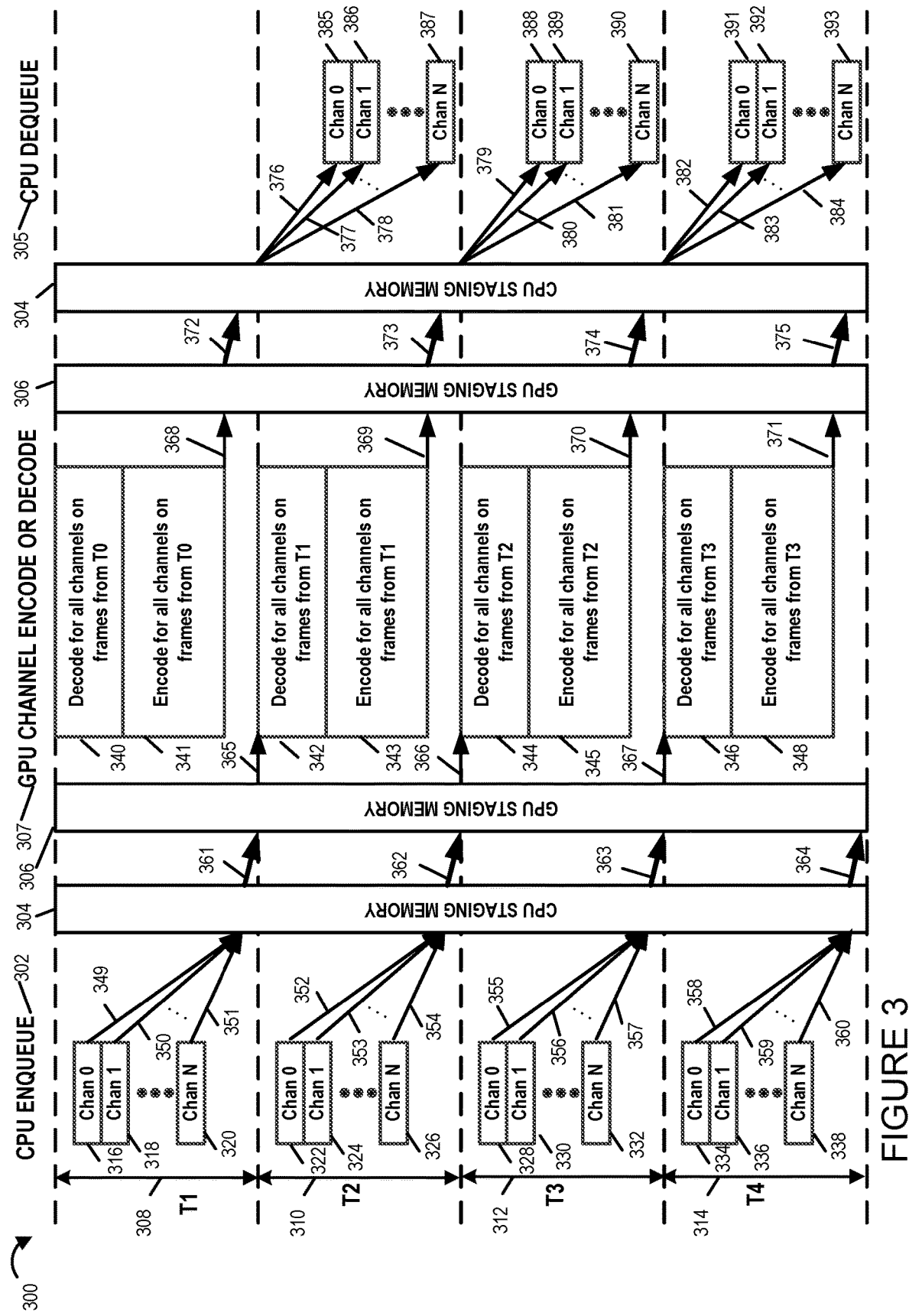
FIG. 3 illustrates processing time sequence of an exemplary embodiment of the present invention.

Diagram 300 of FIG. 3 illustrates processing time sequence of an exemplary embodiment of the present invention. In FIG. 3, CPU staging memory 304 is RAM memory accessible to a CPU, e.g., CPU 202 of FIG. 2. The GPU staging memory 306 is global memory included in a GPU device, e.g., GPU device 204 illustrated in FIG. 2. The GPU staging memory 306 is accessible by all of the GPU processing cores 206 included on the GPU device 204. Time is shown in the diagram 300 as increasing from top to bottom with time periods T1 308, T2 310, T3 312, and T4 314 representing a first frame time, a second frame time, a third frame time and a fourth frame time respectively. A single frame time being the duration of time in which the encoding or decoding of the data for a frame should be completed. The frame time being the codec frame time (time to encode+decode) the received real time data. For encoding or decoding of data in accordance with a G729A codec, the frame time is 10 milliseconds (ms). In such an example, the T1, T2, T3 and T4 frame times are each 10 ms periods. While the frame time T0 is not illustrated in FIG. 3, the reference to decode for all channels on frames from T0, refers to a time period occurring immediately before time T1, the duration of the period of frame time T0 is the same as the duration of the period of frame times T1, T2, T3, and T4. By way of example if the frame times are 10 ms, then T0 would be the time period from 0 ms to 10 ms. T1 would be the time period 10 ms to 20 ms. T2 would be the time period from 20 ms to 30 ms. T3 would be the time period from 30 ms to 40 ms. T4 would be the time period from 40 ms to 50 ms. The dashed lines in diagram 300 indicate the boundaries of the time periods T1, T2, T3, and T4.

During the frame time T1, the CPU receives packets, e.g., RTP packets, from packet streams 0, 1, . . . , N. Each packet stream is referred to as a channel. The CPU processing of received packets occurs in serial. The CPU receives the packets from the multiple streams and processes the packets. Processing the packets includes determining which packets are control packets and which packets are media packets. The CPU performs operations based on the received control packets, e.g., control packets related to enabling/disabling media channels/streams or fetching statistics. At least some of these operations are performed during the T1 frame time which is the same time frame in which the control packets were received. The CPU processes the media packets, e.g., RTP packets, including extracting and synchronizing or reordering the data content of the packet as part of its playout processing. The CPU then stores the data units of the data content for each stream also referred to as a channel in the CPU staging memory 304. This is shown in diagram 300 as part of the CPU enqueue processing 302 performed by the CPU device during the T1 frame time. Chan 0 data 316, Chan 1 data 318, . . . , Chan N data 320 represent data for stream 0, stream 1, . . . , stream N, respectively, which is received and processed by the CPU during the T1 frame time and stored in the CPU staging memory 304. Chan 0 data 322, Chan 1 data 324, . . . , Chan N data 326 represent data for stream 0, stream 1, . . . , stream N, respectively, which is received and processed by the CPU during the T2 frame time and stored in the CPU staging memory 304. Chan 0 data 328, Chan 1 data 330, . . . , Chan N data 332 represent data for stream 0, stream 1, . . . , stream N, respectively, which is received and processed by the CPU during the T3 frame time and stored in the CPU staging memory 304. Chan 0 data 334, Chan 1 data 336, . . . , Chan N data 338 represent data for stream 0, stream 1, . . . , stream N, respectively, which is received and processed by the CPU during the T4 frame time and stored in the CPU staging memory 304.

Arrows 349, 350, . . . , 351 show that the channel 0 data 316, channel 1 data 318, . . . , channel N data 320 is stored in CPU staging memory 304 separately as the channel 0 data 316, channel 1 data 318, . . . , channel N data 320 is processed during the T1 frame time. In some embodiments, the channel data for the different channels is stored serially in the CPU staging memory 304. Once all of the channel data for channels or streams 0, 1, . . . , N for frame time T1 are stored in the CPU staging memory 304, the channel data for channels or streams 0, 1, . . . , N are loaded into the GPU staging memory 306 as illustrated by arrow 361. In most, but not all embodiments, the channel data for channels 0, 1, . . . , N is loaded as a parallel operation from the CPU staging memory 304 to the GPU device staging memory 306. In some embodiments, the channel data is loaded serially into the GPU device staging memory 306.

Arrows 352, 353, . . . , 354 show that the channel 0 data 322, channel 1 data 324, . . . , channel N data 326 is stored in CPU staging memory 304 separately as the channel 0 data 322, channel 1 data 324, . . . , channel N data 326 is processed during the T2 frame time. In some embodiments, the channel data for the different channels is stored serially in the CPU staging memory 304. Once all of the channel data for channels or streams 0, 1, . . . , N for frame time T2 are stored in the CPU staging memory 304, the channel data for channels or streams 0, 1, ..., N are loaded into the GPU staging memory 306 as illustrated by arrow 362. As discussed above, in most, but not all embodiments, the channel data for channels 0, 1, ..., N is loaded as a parallel operation from the CPU staging memory 304 to the GPU device staging memory 306. In some embodiments, the channel data is loaded serially into the GPU device staging memory 306.

Arrows 355, 356, ..., 357 show that the channel 0 data 328, channel 1 data 330, ..., channel N data 332 is stored in CPU staging memory 304 separately as the channel 0 data 328, channel 1 data 330, ..., channel N data 332 is processed during the T3 frame time. As discussed above, in some embodiments, the channel data for the different channels is stored serially in the CPU staging memory 304. Once all of the channel data for channels or streams 0, 1, ..., N for frame time T3 are stored in the CPU staging memory 304, the channel data for channels or streams 0, 1, ..., N are loaded into the GPU staging memory 306 as illustrated by arrow 363. As discussed above, in most, but not all embodiments, the channel data for channels 0, 1, ..., N is loaded as a parallel operation from the CPU staging memory 304 to the GPU device staging memory 306. In some embodiments, the channel data is loaded serially into the GPU device staging memory 306.

Arrows 358, 359, ..., 360 show that the channel 0 data 334, channel 1 data 336, ..., channel N data 338 is stored in CPU staging memory 304 separately as the channel 0 data 334, channel 1 data 336, ..., channel N data 338 is processed during the T4 frame time. As discussed above, in some embodiments, the channel data for the different channels is stored serially in the CPU staging memory 304. Once all of the channel data for channels or streams 0, 1, ..., N for frame time T4 are stored in the CPU staging memory 304, the channel data for channels or streams 0, 1, ..., N are loaded into the GPU staging memory 306 as illustrated by arrow 364. As discussed above, in most, but not all embodiments, the channel data for channels 0, 1, ..., N is loaded as a parallel operation from the CPU staging memory 304 to the GPU device staging memory 306. In some embodiments, the channel data is loaded serially into the GPU device staging memory 306.

The channel data may be, and in some embodiments is, loaded into the GPU device staging memory 306 under control of the CPU.

Figure 4:
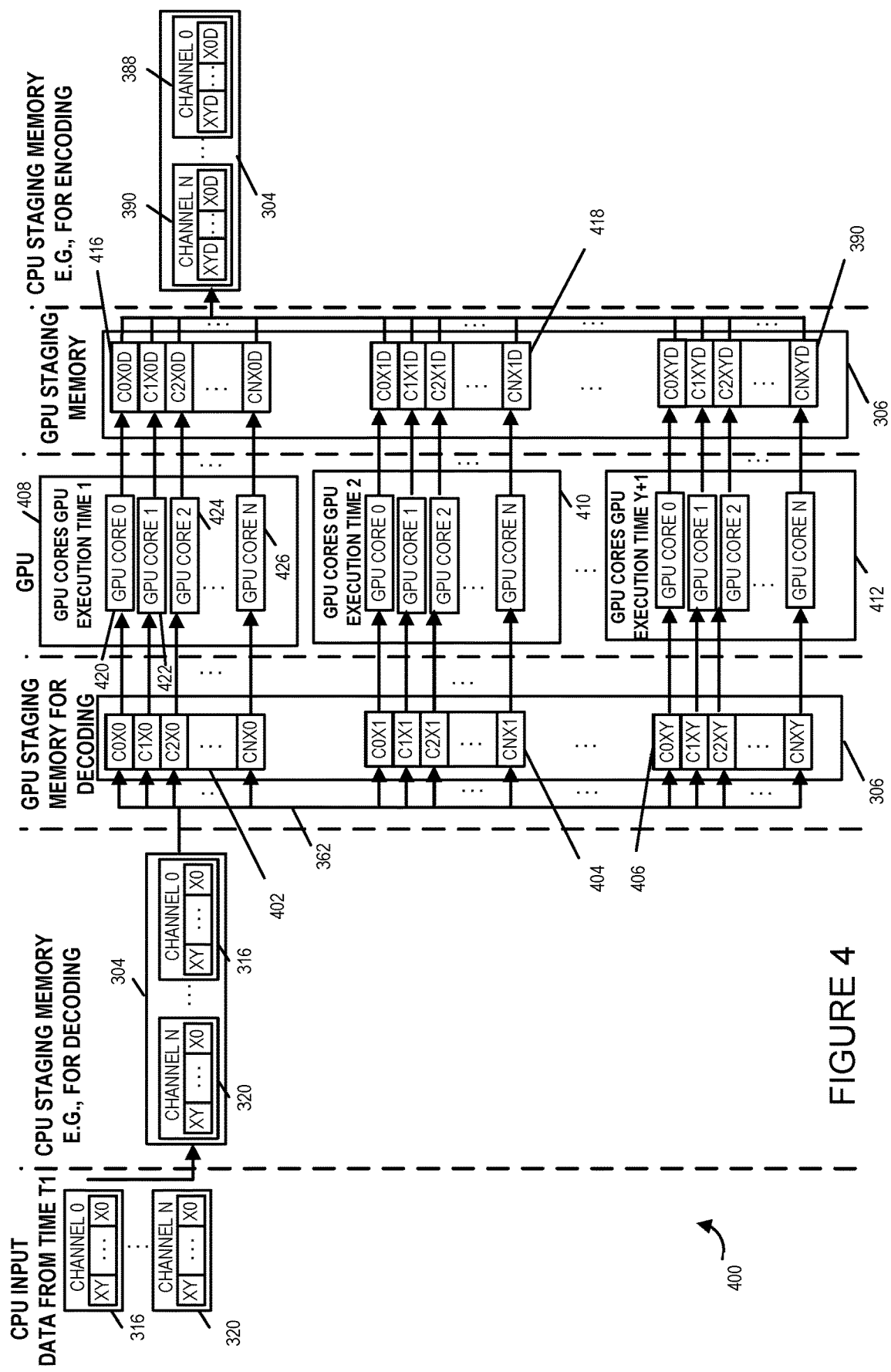
FIG. 4 illustrates further details of the processing flow described in FIG. 3.

Once the channel data for the channels 0, ..., N for a particular frame time, e.g., frame time T1, are loaded in the GPU staging memory 306. The channel data for the channels 0, ..., N is ready to be processed by a plurality of GPU processing cores in the GPU device. The channel data for each of the channels to be processed is divided up into a set of data units for each channel. For example, as shown in FIG. 4, the channel 0 data 322, ..., channel N data 326 corresponding to frame time T1 has been divided up into data units or segments X0, X1, X2, ..., XY for each of the channels to be processed which are channels 0 ... N.

Arrows 365, 366, 367 illustrate the step of loading a set of N GPU processing cores with the channel 0, 1, ..., channel N data for frame times T1, T2, and T3 respectively from the GPU staging memory 306 for GPU channel encode or decode processing operation 307. This transfer of channel data is performed in parallel for each unit of data to be processed. Each of the channels 0, ..., N data includes a plurality of data units. The number of data units per channel to be processed are typically the same. The processing cores of the GPU device then perform either an encode or decode operation. For example, if the GPU channel encode or decode operation 307 is a decode operation then GPU processing cores perform decoding of data for channels 0, ..., N on data received during T0 frame time during the T1 frame time as shown by component 340. The GPU processing cores perform decoding of data for channels 0, ..., N on data received during the T1 frame time during the T2 frame time as shown by component 342. The GPU processing cores perform decoding of data for channels 0, ..., N on data received during the T2 frame time during the T3 frame time as shown by component 344. The GPU processing cores perform decoding of data for channels 0, ..., N on data received during the T3 frame time during the T4 frame time as shown by component 346.

When the GPU channel encode or decode operation 307 is an encode operation then GPU processing cores perform encoding of data for channels 0, ..., N on data received during T0 frame time during the T1 frame time as shown by component 341. The GPU processing cores perform encoding of data for channels 0, ..., N on data received during the T1 frame time during the T2 frame time as shown by component 343. The GPU processing cores perform encoding of data for channels 0, ..., N on data received during the T2 frame time during the T3 frame time as shown by component 345. The GPU processing cores perform encoding of data for channels 0, ..., N on data received during the T3 frame time during the T4 frame time as shown by component 348.

Additionally details of how the GPU cores are loaded and processing is explained in connection with diagram 400 of FIG. 4 discussed below.

Arrows 368, 369, 370, and 371 show how the GPU processed channel data for channels 0, ..., N are outputted during frame time T1, T2, T3, and T4 respectively from the GPU processing cores of the GPU device to the GPU staging memory 306. The GPU processed data will either be encoded or decoded data based on whether the GPU channel encode or decode operation 307 was performing an encode or decode operation on the channel data provided to the GPU.

Arrows 372, 373, 374, and 375 illustrate how the GPU processed channel data for channels 0, ..., N for frame times T0, T1, T2, and T3 are outputted from the GPU staging memory 306 to the CPU staging memory 304 during frame times T1, T2, T3, and T4 respectively. The transfer of the data from the GPU staging memory to the CPU staging memory 304 is done in parallel in the exemplary embodiment. This transfer may be, and typically is, performed under the control of the CPU.

Arrows 376, 377, and 378 respectively show the CPU dequeue 305 operation where the GPU processed T0 channel data frames for channel 0 385, channel 1 386, ..., channel N 387 for frame time T0 are separately and respectively retrieved/outputted from the CPU staging memory 304 under the control of the CPU during frame time T2. If a decoding operation was performed on the channel 0, ..., N T0 data frames then channel 0 data 385, channel 1 data 386, ..., channel N data 387 is decoded data. If an encoding operation was performed on the channel 0, ..., N T0 data frames then channel 0 data 385, channel 1 data 386, ..., channel N data 387 is encoded data.

Arrows 379, 380, and 381 respectively show the CPU dequeue 305 operation where the GPU processed T1 channel data frames for channel 0 388, channel 1 389, ..., channel N 390 for frame time T1 are separately and respectively retrieved/outputted from the CPU staging memory 304 under the control of the CPU during frame time T3. If a decoding operation was performed on the channel 0, ..., N T1 data frames then channel 0 data 388, channel 1 data 389, ..., channel N data 390 is decoded data. If an encoding operation was performed on the channel 0, ..., N T1 data frames then channel 0 data 388, channel 1 data 389, ..., channel N data 390 is encoded data.

Arrows 382, 383, and 384 respectively show the CPU dequeue 305 operation where the GPU processed T2 channel data frames for channel 0 391, channel 1 392, ..., channel N 393 for frame time T2 are separately and respectively retrieved/outputted from the CPU staging memory 304 under the control of the CPU during frame time T4. If a decoding operation was performed on the channel 0, ..., N T2 data frames then channel 0 data 391, channel 1 data 392, ..., channel N data 393 is decoded data. If an encoding operation was performed on the channel 0, ..., N T2 data frames then channel 0 data 391, channel 1 data 392, ..., channel N data 393 is encoded data.

By employing the pipeline approach illustrated in FIG. 3 where the CPU and GPU processing happen concurrently but in a time shifted manner, the processing of a single frame within the codec's frame time of 10 ms is achieved by the GPU, and the additional delay introduced is insignificant. Methods, systems and apparatus which utilize the present invention are thereby able to ensure high encoding, decoding and/or transcoding scale with bounded response times for incoming jobs from media as well as control plane in a real-time encoding, decoding and/or transcoding application. The present invention is also applicable to providing encryption and decryption processing services for real-time content streams, e.g., audio packet streams.

Processing flow diagram 400 shown in FIG. 4 will now be discussed. Processing flow diagram 400 illustrates additional details of a portion of the processing flow illustrated in FIG. 3. The diagram 400 shows the flow of channel 0, ..., N T1 channel data frames through the system and in particular how the processing is performed in the GPU processing cores of the GPU device on the T1 channel data frames.

Diagram 400 of FIG. 4 illustrates channel data 0 316, ..., channel data N 320 received by the CPU during frame time T1. These are T1 channel data frames. Each of the T1 data frames includes a plurality of data units sometimes referred to herein as a set of data units. The channel 0 T1 data frame 316 includes the set of data units X0, ..., XY. The channel N T1 data frame 320 includes the set of data units X0, ..., XY. The data included in the channel 0 set of data units X0, ..., XY being different from the channel 0 set of data units X0, ..., XY. In the exemplary embodiment each of the channel data frames or data sets includes the same number of data units. The channel 0 to channel N data frames 316 to 320 received during the T1 frame time as explained in connection with FIG. 3 are loaded into the CPU staging memory 304 during the T1 frame time as separate channel frame data as it is processed. For example, the data being loaded or supplied from the RTP playout processing component 108 of the CPU 202 or the playout buffer 110 of the CPU 202.

In this example, the channel 0 316, ..., channel N 320 T1 frame time data is shown in diagram 400 of FIG. 4 as being stored in the CPU staging memory 306 in first in first out order (FIFO). Diagram 400 further illustrates how the channel 0 316, ..., channel N 320 T1 frame data is loaded in parallel into the GPU staging memory 306 on the GPU device in parallel for a decoding operation as symbolized by the arrow 362. In this example, the 0 through Y data units of each set of data units which make up the channels 0, 1, 2, ..., N T1 data frames have been organized in the GPU staging memory so that they are stored in adjacent memory allowing for coalesced access and loading of the GPU processing cores. That is the set of data units 402 corresponding to the X0 bit of each channel from frame T1 time which includes channel 0 X0 data unit (C0X0), channel 1 X0 data unit (C1X0), channel 2 X0 data unit (C2X0), ..., channel N X0 data unit (CNX0) are located in adjacent memory in the GPU staging memory 306. The set of data units 404 corresponding to the X1 bit of each channel from frame T1 time C0X1, C1X1, C2X1, ..., CNX1 data units are located in adjacent memory in the GPU staging memory. The set of data units 406 corresponding to the XY bit of each channel from frame T1 time C0X1, C1X1, C2X1, ..., CNX1 data units are located in adjacent memory in the GPU staging memory. Similarly, the remaining data units of the frame are organized in the GPU staging memory to be located in adjacent memory.

As previously discussed the graphics processing unit includes a plurality of processing cores. The GPU in FIG. 4 is shown with a set of GPU processing cores including GPU processing core 0 420, GPU processing core 1 422, GPU processing core 2 424, ..., GPU processing core N 426.

From the GPU staging memory 306, the channel 0 X0 data unit, channel 1 X0 data unit, channel 2 X0 data unit, ..., channel N X0 data unit of the set of data units 402 are all loaded in parallel into separate GPU processing cores 0, 1, 2, ..., N. There is one GPU processing core for each data unit which results in one GPU processing core for each channel being processed.

Each of the GPU processing cores of the set of 0, 1, 2, ..., N GPU processing cores executes the same encoding or decoding operation concurrently on the same data unit for each channel. In this example, the GPU processing cores are operated to perform a first decoding operation on the first set of data units C0X0, C1X0, C2X0, ..., CNX0 402 during a GPU execution time 1 408. During the execution time 1 408, each of the GPU cores 0 420, 1 422, 2 424, ..., N 426 performs a first decoding operation on first data unit X0 from each of the channels 0, 1, 2, ..., N. When an encoding service is being provided, during the execution time 1 408, each of the GPU cores 0 420, 1 422, ..., N 426 performs a first encoding operation on first data unit X0 from each of the channels 0, 1, 2, ..., N which are included in the first data set 402. The decoded or encoded data unit is then loaded into the GPU staging memory 306 from the set of the GPU processing cores 0, 1, 2, ..., N. The outputting of processed data units C0X0D, C1X0D, C2X0D, ..., DNX0D from the set of GPU processing cores 0, 1, 2, ..., N is done in parallel. The set of generated data units C0X0D, C1X0D, C2X0D, ..., DNX0D is a set of decoded generated data units in the example shown in FIG. 4 as the GPU cores executed a decoding operation during execution time 1 408. This process is then sequentially repeated for each of the additional data units X1, ..., XY. That is the set of X1 data units for channels 0, ..., N for frame time T1 404 are loaded into a plurality of GPU processing cores shown in FIG. 4 as processing cores 0, 1, 2, ..., N which perform a second decoding operation in parallel or concurrently during a GPU execution time 2 410. The set of decoded X1 channel 0, ..., N frame T1 data units 418 including C0X1D, C1X1D, C2X1D, ..., CNX1D are then outputted to the GPU staging memory 306 in parallel. This process is repeated for each of the remaining data units of the channel 0, ..., N T1 data frames until all of the data units are processed, the last data unit in this example being the XY data unit for each channel which is executed during execution time Y+1. The GPU operations performed during the execution times 1, 2, . . . , Y+1 are performed sequentially with the total amount of execution time for the 1, 2, . . . , Y+1 execution times being less than 1 frame time, e.g., 10 ms. That is the sum of GPU execution times 1, 2, . . . , Y+1 will be less than one frame time where Y+1 is the number of data units per frame to be processed for the encoding or decoding operation. One GPU processing core is used for each data unit of each channel. The entire encode/decode operation for a single channel can be offloaded from the CPU on to a single GPU thread while ensuring the processing time is less than frame time.

While GPU processing cores 0, 1, 2, . . . , N have been shown as being selected to perform the first decoding operation on the X0 data unit for frame time T1 of each of the channels 0 to N (data unit set 402), the specific processing cores selected is not important. Similarly, for explanatory purposes, the same set of GPU processing cores 0, 1, 2, . . . , N have been shown as processing data units from the same channel for different execution times. In most, but not all, embodiments, different GPU processing cores will process different data units from different channels during different execution times. For example, the C0X1 data unit may, instead of being processed by GPU processing core 0 420, may be processed by GPU processing core 2 424 or GPU processing core N 426.

The decoded or encoded T1 frame data for channels 0, . . . , N in the GPU staging memory 306 is then loaded into or transferred to CPU staging memory 304. In this case it is decoded T1 frame data, as the operation performed was a decoding operation. The loading of the data into the CPU staging buffer is typically performed under the direction or control of the CPU. In the example shown in diagram 400 of FIG. 4, the decoded data is transferred or loaded into the CPU staging memory 304 in parallel. The decoded data is transferred or loaded into the CPU staging memory 304 during the T2 frame time. The decoded data is reorganized so that it stored as decoded data frames. That is channel 0 decoded T1 frame data 388 is stored as decoded data units in adjacent memory as follows channel 0 XYD, . . . , X0D data units. The channel N frame T1 data 390 is stored as channel N XYD, . . . , X0D data units.

In one exemplary embodiment, an Intel E5-2690v2 processor is used for the CPU device and a NVIDIA GTX 970 is used for the GPU device. G729A transcoding (encode+decode), with a 10 ms frame-time, takes approximately 35 us for one channel on the E5-2690v2 processor. On a CPU we can achieve approximately 285 transcodes using just the E5-2690v2 CPU. When the transcoding operation is offloaded per channel processing to a single GTX970 thread, it takes approximately 6 ms. However in this 6 ms 1664 channels can be processed (GTX970 has 1664 processing cores). This illustrates how using GPU devices results in greater efficiency as the number of channels to be processed increases, i.e., as the system is scaled.

Furthermore, in some embodiments, the time for the GPU processing cores to complete the encoding or decoding operation for all channels on a data frame for a particular frame time is less than the codec frame time. In such cases, the GPU processing cores may be, and typically are, used for performing other processing tasks. For instance, they may be, and in some embodiments are used to perform encoding or decoding on additional channels. For example, if the T2 frame time is 10 ms and the GPU processing cores e.g., have completed the decoding or encoding operation for all channels 0, . . . , N T1 data frames and the encoded or decoded T1 frame data has been transferred to the GPU staging memory within 5 ms, then the GPU processing cores may begin to perform encode or decode operations for another different set of channels during the remaining 5 ms. In some embodiments in which a transcoding operation is to be performed the GPU processing cores which complete the decoding operation within 5 ms can then be used to perform an encoding operation on the same or different decoded data frames.

Not all GPU processing cores on a GPU device need to be performing the same encoding or decoding processing operation. For example if the GPU has 1000 processing cores, some number of those GPU processing cores may be used for G.711 decoding operations on a first set of data while other GPU processing cores may be operated concurrently for G.729A decoding operations on another set of data. In some embodiments, some of the GPU processing cores may be used to perform encoding operations for a first codec type on a first set of data while other GPU cores are used to perform decoding operations for a different codec type on a different set of data.

In some embodiments, such as the trancoding embodiment shown in FIG. 2, once the decoding operation has been completed for all data of a particular frame and the decoded frame data has been transferred from the GPU processing cores to the GPU staging memory and back out to the CPU, the decoded frame data may then be transferred back to the same or most likely different GPU processing cores of the same or a different GPU device for encoding operations to encode the decoded data using a different codec. For example, channel frame data in a format specified by G.711 standard may be received and decoded and then encoded into channel frame data in a format specified by the G.729A standard thereby transcoding the received data from G.711 to G.729A. In some embodiments, the CPU itself may perform the encoding operation to complete the transcoding of the data when the GPU device is configured to encode in the required standard. In this way, the system still achieves efficiencies with the decoding operations while the CPU is used for the encoding portion of the transcoding. In some embodiments instead of the decoded data being outputted from the GPU staging memory to the CPU staging memory, the decoded data is inputted back into the same or different GPU processing cores where the data is encoded and then the encoded data is transferred to the GPU staging memory and then to the CPU staging memory.

In some embodiments, the GPU processing cores upon completion of a single processing operation, e.g., GPU execution time 1 408 shown in FIG. 4, are released and available for performing other processing operations. In such embodiments, the GPU is configured or programmed to ensure that if the system is processing frame data for N channels that at the start of each frame time, N GPU processing cores are available to process the next frame of the N channels frame data.

By employing the pipeline approach illustrated in FIG. 3 where the CPU and GPU processing happens concurrently but in a time shifted manner, the processing of a single frame within the codec's frame time of 10 ms is achieved by the GPU and the additional delay introduced is insignificant. Methods, systems and apparatus which utilize the present invention are thereby able to ensure high encoding, decoding and/or transcoding scale with bounded response times for incoming jobs from media as well as control plane in a real-time encoding, decoding and/or transcoding application. The present invention is also applicable to providing encryption and decryption processing services for real-time content streams, e.g., audio packet streams.

Figure 5A:
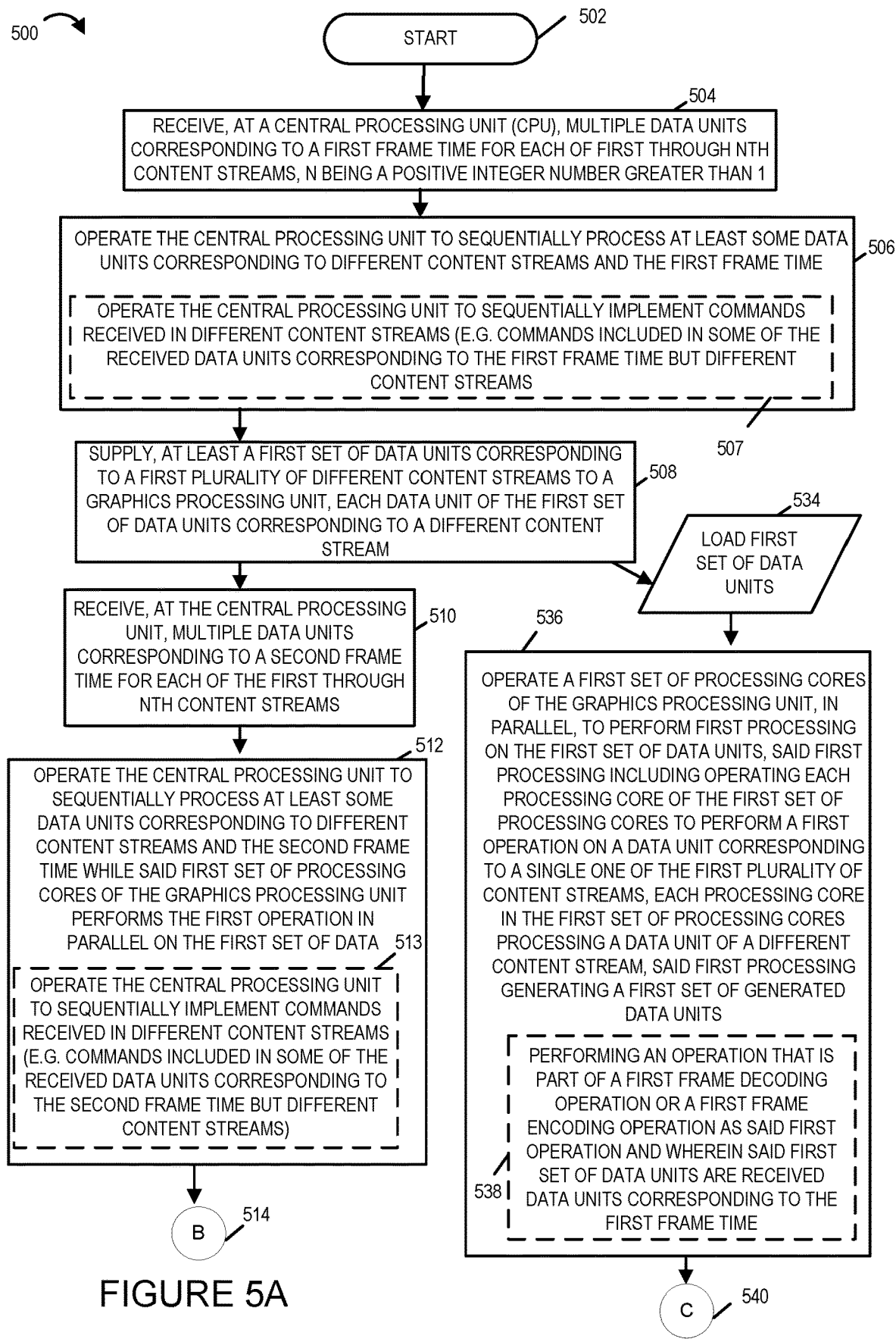
FIG. 5A illustrates a first part of a flowchart of an exemplary method in accordance with an embodiment of the present invention.
Figure 5B:
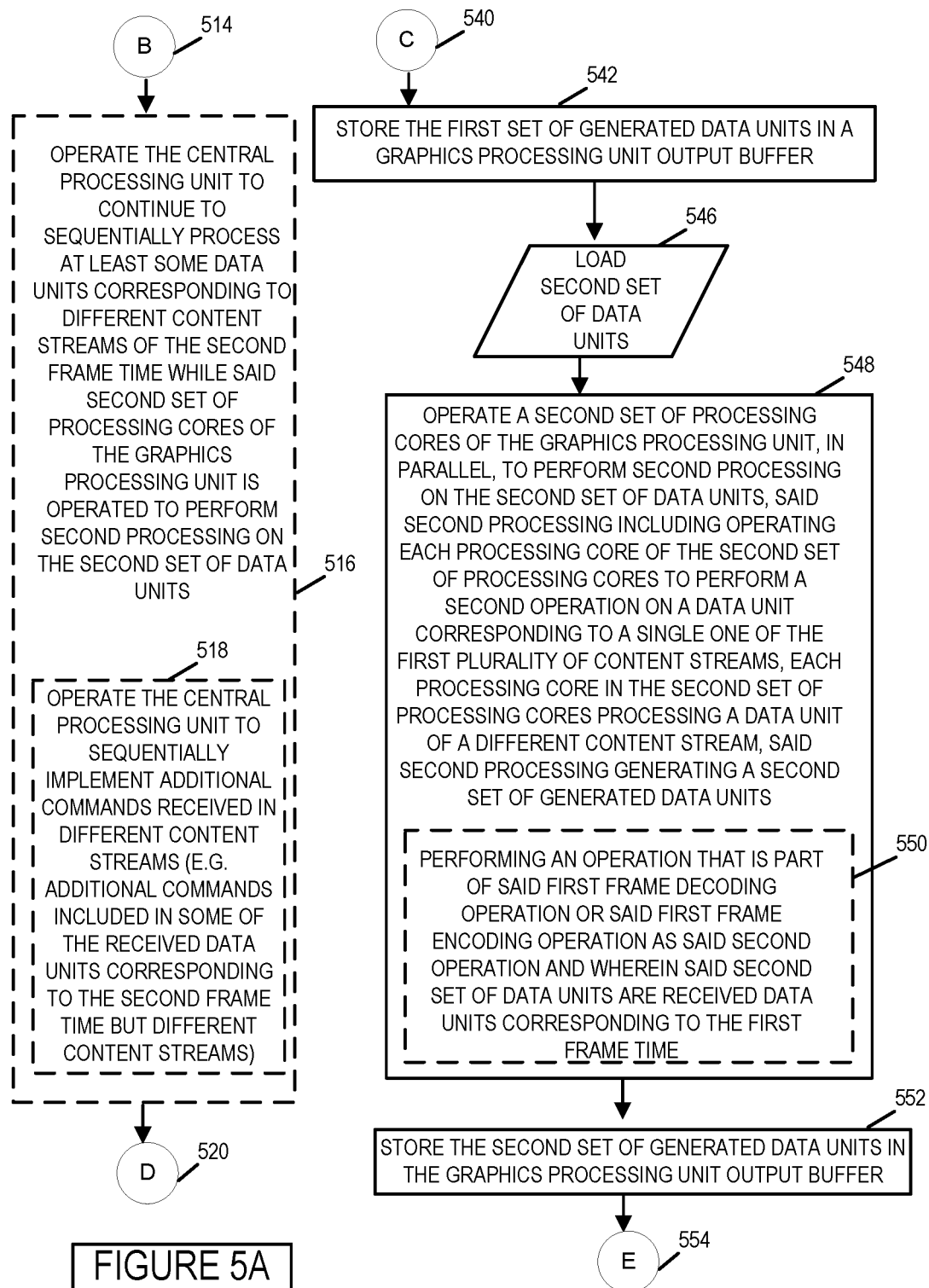
FIG. 5B illustrates a second part of a flowchart of an exemplary method in accordance with an embodiment of the present invention.
Figure 5C:
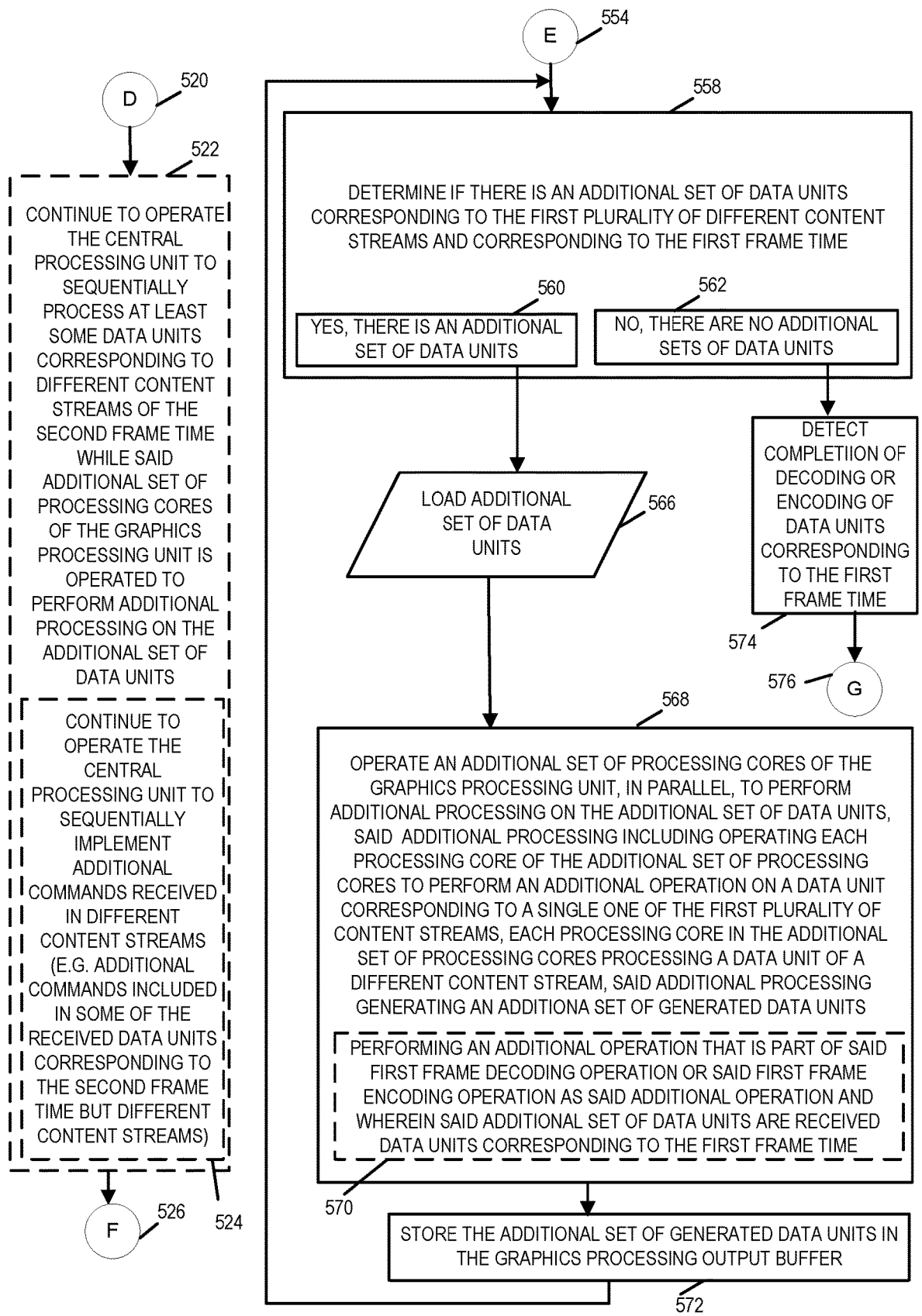
FIG. 5C illustrates a third part of a flowchart of an exemplary method in accordance with an embodiment of the present invention.

FIG. 5 comprises the combination of FIGS. 5A, 5B, 5C, and 5D. FIG. 5A illustrates a first part of a flowchart of an exemplary method in accordance with an embodiment of the present invention. FIG. 5B illustrates a second part of a flowchart of an exemplary method in accordance with an embodiment of the present invention. FIG. 5C illustrates a third part of a flowchart of an exemplary method in accordance with an embodiment of the present invention. FIG. 5D illustrates a fourth part of a flowchart of an exemplary method in accordance with an embodiment of the present invention. The method 500 described in connection with FIG. 5 may be, and in some embodiments is, implemented using a CPU device, a GPU device and memory. An exemplary, CPU device is the Intel E5-2690v2 processor and an exemplary GPU device is the NVIDIA GTX 970. GPU device includes a controller which executes instructions to control the operation of the GPU device including the GPU processing cores which including hardware processing circuitry. The GPU controller is configured to control transfer of data between buffer locations, transfer of data to and from cores of the GPU as well as the receipt and/or output of data from the GPU among other things.

The method 500 starts at start step 502. Operation proceeds from start step 502 to receiving step 504.

In step 504, a Central Processing Unit (CPU) device receives multiple data units corresponding to a first frame time for each of first through Nth content streams, N being a positive integer number greater than 1. The content streams are also referred to as channels herein. N is typically a large number, e.g., 1600, and in some embodiments is equal to or slightly less than the number of GPU processing cores on the GPU device being used in the system. In some embodiments, the multiple data units corresponding to the first frame time are received by the CPU sequentially, on a per stream basis. In some embodiments, the multiple data units corresponding to the first frame time are received by the CPU from memory (e.g., RAM coupled to the CPU) with multiple data units (e.g., packetized data) corresponding to a first content stream and said first frame time being received by said CPU prior to multiple data units (e.g., packetized data) corresponding to a second content stream and said first frame time. Operation proceeds from step 504 to step 506.

In step 506 the central processing unit is operated to sequentially process at least some data units corresponding to different content streams and the first frame time. In some embodiments, step 506 includes sub-step 507. In sub-step 507 the central processing unit is operated to sequentially implement commands received in different content streams (e.g., commands included in some of the received data units corresponding to the first frame but different content streams. In some embodiments, the commands are media or media stream enable or disable commands. Operation proceeds from step 508.

In step 508, at least a first set of data units corresponding to a first plurality of different content streams is supplied to a Graphics Processing Unit device (GPU), e.g., under control of the CPU. A second set and/or additional sets of data units corresponding to the first plurality of different contents streams are normally supplied together to the Graphics processing unit. Each data unit of the first set of data units corresponds to a different content stream. Similarly, each data unit for the second and additional sets of data units corresponds to a different content stream. For example, the first, second, and additional sets of data units may be, and in some embodiments are, received data units corresponding to the first frame time. In some, but not all embodiments, the first, second, and/or additional sets of data units corresponding to the first frame time are loaded into or supplied to a graphics processing unit global memory accessible to each processing core in the graphics processing unit. In some embodiments, the data units are loaded or supplied in parallel while in other embodiments they are loaded or supplied serially. In some embodiments, the first, second and/or additional sets of data units are subsets of the multiple data units received by the CPU during the first frame time and corresponding to a first through Nth content stream. Operation proceeds from step 508 to steps 510 and 534.

The flowchart of method 500 illustrates parallel paths of steps which illustrates operations being performed by the CPU and GPU devices in parallel or concurrently as described in further detail below. In some embodiments of the method 500, the graphics processing unit is operated to perform sequential parallel processing on different sets of data units corresponding to the first frame time, each sequentially processed set of data units including one data unit from each of said plurality of different content streams as illustrated in connection with flow diagram 400 of FIG. 4.

In step 534, the first set of data units is loaded into or supplied to a first set of processing cores of the graphics processing unit. The first set of data units is typically loaded in parallel from the graphics processing unit's global memory. For example, memory 306 shown in FIGS. 3 and 4.

In step 536, the first set of processing cores of the graphics processing unit are operated in parallel to perform first processing on the first set of data units. The first processing includes operating the each processing core of the first set of processing cores to perform a first operation on a data unit corresponding to a single one of the first plurality of content streams with each processing core in the first set of processing cores processing a data unit of a different content stream. The first processing generating a first set of generated data units. The step of generating a first set of generated data units based on the first set of data units is a transformative step in which the processed data has been transformed by the first processing. In some embodiments the first set of data units are received data units corresponding to the first frame time and step 536 includes step 538. In step 538, the first operation that is performed is an operation performed as part of a first frame decoding operation or a first frame encoding operation and is performed on the first set of data units which are the received data units. Operation proceeds from step 536 via connection node C 540 to step 542 shown on FIG. 5B. In step 542, the first set of generated data units are stored in a graphics processing unit output buffer. Operation proceeds from step 542 to step 546.

Returning to step 510 of the method 500, in step 510 the central processing unit receives multiple data units corresponding to a second frame time for each of the first through Nth content streams. Operation proceeds from step 510 to step 512.

In step 512, the central processing unit is operated to sequentially process at least some data units corresponding to different content streams and the second frame while the first set of processing cores of the graphics processing unit performs a first operation in parallel on the first set of data. In some embodiments, step 512 includes sub-step 513. In sub-step 513, the central processing unit is operated to sequentially implement commands received in different content streams, e.g., commands included in some of the received data units corresponding to the second frame time but different content streams. In some embodiments, the commands are media or media stream enable or disable commands. Operation proceeds from step 512 via connection node B 514 to optional step 516 illustrated on FIG. 5B.

As previously discussed, operation proceeds from step 542 to step 546. In step 546, a second set of data units corresponding to the first plurality of different content streams and the first frame time is supplied to or loaded into a second set of graphics processing cores of the graphics processing unit. Each data unit of the second set of data units corresponding to a different content stream and the first frame time. The second set of data units may be, and typically is, supplied to the graphics processing unit the first set of data units corresponding to the first plurality of different content streams and the first frame time. In some embodiments, the second set of data units is stored in and loaded or supplied to the second set of graphics processing cores from the graphics processing unit global memory. The second set of data units is typically supplied to or loaded in the second set of processing cores of the graphics processing unit in parallel. Operation proceeds from step 546 to step 548.

In step 548 the second set of processing cores of the graphics processing unit is operated in parallel to perform second processing on the second set of data units. The second processing including operating each processing core of the second set of processing cores to perform a second operation on a data unit corresponding to a single one of the first plurality of content streams. Each processing core in the second set of processing cores processing a data unit of a different content stream. The second processing generating a second set of generated data units. The step of generating a second set of generated data units based on the second set of data units is a transformative step in which the processed data has been transformed by the second processing. In some embodiments the second set of data units are received data units corresponding to the first frame time and step 548 includes step 550. In step 550, the second operation that is performed is an operation performed as part of said first frame decoding operation or said first frame encoding operation and is performed on the second set of data units which are the received data units. Operation proceeds from step 548 to step 552.

In step 552, the second set of generated data units are stored in the graphics processing unit output buffer. Operation proceeds from step 552 via connection node E 554 to step 558 shown on FIG. 5C.

As previously explained operation proceeds from step 512 via connection node to B 514 to optional step 516 shown on FIG. 5B. In optional step 516 the central processing unit is operated to continue to sequentially process at least some data units corresponding to different content streams of the second frame time while said second set of processing cores of the graphics processing unit is operated to perform said second processing on the second set of data units. In some embodiments, optional step 516 includes sub-step 518. In sub-step 518 the central processing unit is operated to sequentially implement additional commands, e.g., first additional commands, received in different content streams (e.g., additional commands included in some of the received data units corresponding to the second frame time but different content streams). The additional commands are media or media stream enable or disable commands. Operation proceeds from optional step 516 via connection node D 520 to optional step 522 shown on FIG. 5C.

Return now to the operation of step 558. In step 558, the GPU device is operated to determine if there is an additional set of data units corresponding to the first plurality of different content streams and corresponding to the first frame time. As noted in sub-step 558, when the determination is yes, there is an additional set of data units corresponding to the first plurality of different content streams and corresponding to the first frame time operation, proceeds from step 558 to step 566. Otherwise, as shown in sub-step 562 of step 558 when it is determined that there are no additional sets of data units corresponding to the first plurality of different content streams and corresponding to the first frame time operation proceeds from step 558 to step 574.

In step 566, the additional set of data units corresponding to the first plurality of different content streams and the first frame time is supplied to or loaded into an additional set of graphics processing cores of the graphics processing unit in a similar manner to that described in connection with the first and second of data units corresponding to the first plurality of different content streams and the first frame time. Each data unit of the additional set of data units corresponding to a different content stream. Operation proceeds from step 566 to step 568.

Step 558 is the beginning of loop that determines if there additional sets of data units corresponding to the first plurality of different content streams and corresponding to the first frame time. With each pass through the loop supplying a different additional set of data units corresponding to the first plurality of different content streams and corresponding to the first frame time being: loaded, processed by processing cores of the GPU to generate additional sets of data units, and then the additional generated sets of data units being stored in the GPU output buffer until there are no more additional sets of data units corresponding to the first frame time to be processed. In this way all of the data units of the different contents streams corresponding to the first frame time are sequentially processed as sets of data units.

In step 568, the additional set of processing cores of the graphics processing unit is operated in parallel to perform additional processing on the additional set of data units. The additional processing including operating each processing of the additional set of processing cores of the graphics processing unit to perform an additional operation on a data unit corresponding to a single one of the first plurality of content streams. Each processing core in the additional set of processing cores processing a data unit of a different content stream. The additional processing generating an additional set of generated data units.

In some embodiments the additional set of data units are received data units corresponding to the first frame time and step 568 includes step 570. In step 570, the additional operation that is performed is an operation performed as part of said first frame decoding operation or said first frame encoding operation and is performed on the additional set of data units which are the received data units. Operation proceeds from step 568 to step 572.

In step 572, the additional set of generated data units are stored in the graphics processing unit output buffer. Operation proceeds from step 572 back to determination step 558 where the process is repeated when it is determined that there is an additional set of data units to be processed. With each pass through steps 566, 568 and 572 a different set of supplied data units is processed, generating a different set of generated data units, which is stored in the output buffer. This is the same as or similar to the process shown in diagram 400 of FIG. 4 where in the GPU processing cores 0, 1, 2, ... N operate on different sets of data units (e.g., data sets 402, 404, ..., 406) during GPU execution times 1 408, 2 410, ..., Y+1 412. When it is determined in step 558 that there are no additional sets of data units to be processed as previously discussed operation proceeds from step 558 to step 574.

In step 574, the completion of decoding or encoding of data units corresponding to the first frame time is detected, e.g., by the GPU device. Operation proceeds from step 574 via connection node G 576 to step 578 shown FIG. 5D.

Returning to optional step 522, in step 522 the central processing unit continues to be operated to sequentially process at least some data units corresponding to different content streams of the second frame time while said additional set of processing cores of the graphics processing unit is operated to perform additional processing on the additional set of data units. In some embodiments, step 522 includes step 524 which includes continuing to operate the central processing unit to sequentially implement additional commands, e.g., second additional commands, received in different content streams, e.g., included in some of the received data units corresponding to the second frame time but different content streams. Operation proceeds from step 524 via connection node F 526 to step 528 shown on FIG. 5D.

Returning now to step 578, in step 578, the generated data units generated from processing data units corresponding to the first frame are transferred from the GPU output buffer to the memory accessible to the CPU following detection of the completion of decoding or encoding of data units corresponding to the first frame time. The generated data units are the sets of generated data units, e.g., first set of generated data units, second set of generated data units, . . . , additional sets of generated data units. Operation proceeds from step 578 to step 580.

In step 580, at least a third set of data units corresponding to the first plurality of different content streams and the second frame time are supplied to the graphics processing unit, each data unit of the third set of data units corresponding to a different content stream. The third set of data units may be, and in some embodiments are, a subset of the multiple data units received by the CPU corresponding to/received during the second frame time for each of the first through Nth content streams. The third set of data units corresponding to the first plurality of different content streams and the second frame time are supplied in a manner same as or similar to that described in connection with step 508. Operation proceeds from step 580 to step 582.

In step 582, the third set of data units corresponding to the first plurality of different content streams and the second frame time are loaded into or supplied to a third set of processing cores of the graphics processing unit in a manner the same as or similar to the loading or supplying of first set of data units discussed in connection with step 534.

In step 584, a third set of processing cores of the graphics processing unit is operated in parallel to perform third processing on the third set of data units. The third processing including operating each processing core of the third set of processing cores to perform a third operation on a data unit corresponding to a single one of the first plurality of content streams. Each processing core in the third set of processing cores processing a data unit of a different content stream, said third processing generating a third set of generated data units corresponding to a second frame time. Said operating a third set of processing cores of the graphics processing unit occurring while said central processing unit processes data units corresponding to a third frame time. In some embodiments, step 584 includes optional sub-step 586. In sub-step 586, the third operation performed by the third set of processing cores is part of a second frame decoding operation or a second frame encoding operation and the third set of data units are received data units corresponding to the second frame time. Operation proceeds from step 584 to step 588.

In step 588 the GPU device is operated to store the third set of generated data units in the graphics processing output buffer. Operation proceeds from step 588 to step 590.

Returning to step 528, in step 528, the central processing unit is operated to sequentially process at least some data units corresponding to the different content streams and the third frame time while said third set of processing cores of the graphics processing unit performs the third operation in parallel on the third set of data units. The at least some data units corresponding to the different content streams and the third frame time being data units received during the third frame time by the CPU. In some embodiments, step 528 includes optional step 530. In step 530 the central processing unit is operated to sequentially implement commands received in different content streams (e.g., commands included in some of the received data units corresponding to the third frame time but different content streams). Operation proceeds from step 528 to step 532.

In step 532 the method proceeds with the CPU continuing to receive and process additional multiple data units for different content streams during additional frame times as time progresses in a manner the same as or similar to the receipt and processing of multiple data units received corresponding to the first frame time.

In step 532, the method proceeds with the GPU continuing to receive additional sets of data units, parallel process the additional sets of data units and store the generated data units generated by the parallel processing of the additional sets of data units in the GPU output buffer.

In some embodiments of the method 500, wherein the first operation is a first decoding operation corresponding to a first standard and wherein the first set of generated data units generated by said parallel processing is a first set of decoded data units corresponding to the first plurality of content streams, the method further includes the steps of: (1) supplying the first set of decoded data units to a fourth set of processing cores of the graphics processing unit, said fourth set of processing cores including the same or different processing cores as the first or second processing cores, and (2) operating the fourth set of processing cores in parallel to perform an encoding operation on the first set of decoded data units corresponding to the first plurality of content streams. In some such embodiments of method 500, the encoding operation is an encoding operation corresponding to a second standard which is different from said first standard. In some embodiments of the method 500 the first decoding operation is performed within an amount of time equal to or less than an amount of time allowed by the first standard for decoding a frame and wherein said encoding operation is performed in an amount of time equal to or less than an amount of time allowed by the second standard for encoding a frame.

In some embodiments of the method 500, the first plurality of content streams is a plurality of voice content streams corresponding to different voice calls being communicated using data units in the form of packets.

In some embodiments, after step 578 the CPU will access the generated data units stored corresponding to the first frame time for further processing. For example, when the GPU is performing an encoding operation, the generated data units will be encoded generated data units that the CPU may then packetize and transfer to an output buffer or queue that is accessible to a network processor for transmitting on a network. In another embodiment in which the GPU performed a decoding operation, the generated data will be unencoded data that the CPU can playback or transfer to a playback device or another storage device. In another embodiment in which the GPU performed a decoding operation, the CPU encodes the decoded media to place it in a different format so as to complete a transcoding operation before packetizing the encoded data for transmission. In some embodiments in which the GPU performed a decoding operation, the CPU transfers the decoded generated data units back to the GPU for encoding in accordance with a different codec standard than which the data was originally encoded in when received so that a transcoding operation can be completed before the CPU packetizes the data units and transferred them to an output queue for transmission.

In some embodiments, the GPU operations performed by the GPU processing cores on the supplied data units corresponding to different content streams and the first frame time is an encrypting or decrypting operation.

The first, second and third set of processing cores of the graphics processing unit may, and in some embodiments does, include at least some of the same processing cores of the GPU processing unit. In some but not necessarily all embodiments the first, second, and third frame times have the same duration. The third frame time occurring after the second frame time which occurs after the first frame time.

Various embodiments of the present invention able to ensure high encoding, decoding and/or transcoding scale with bounded response times for incoming jobs from media as well as control plane in a real-time encoding, decoding and/or transcoding application. The present invention is also applicable to providing encryption and decryption processing services for real-time content streams, e.g., audio packet streams.

Set forth below are various exemplary numbered embodiments.

Each set of numbered exemplary embodiments is numbered by itself with embodiments in a set referring to previous numbered embodiments in the same set.

List of First Set of Exemplary Numbered Method Embodiments

Method Embodiment 1

A communications method, the method comprising: receiving, at a central processing unit (CPU), multiple data units corresponding to a first frame time for each of first through Nth content streams (N being a positive integer number greater than 1); operating the central processing unit to sequentially process at least some data units corresponding to different content streams and the first frame time; supplying, a first set of data units corresponding to a first plurality of different content streams to a graphics processing unit, each data unit of the first set of data units corresponding to a different content stream; operating a first set of cores of the graphics processing unit, in parallel, to perform first processing on the first set of data units, said first processing including operating each core of the first set of cores to perform a first operation on a data unit corresponding to a single one of the first plurality of content streams, each core in the first set of cores processing a data unit of a different content stream, said first processing generating a first set of generated data units; and storing the first set of generated data units in a graphics processing unit (GPU) output buffer.

Method Embodiment 2

The method of method embodiment 1, wherein said multiple data units corresponding to the first frame time are received by the CPU sequentially, on a per stream basis.

Method Embodiment 3

The method of method embodiment 2 wherein said multiple data units corresponding to the first frame time are received by the CPU from memory (e.g., RAM coupled to the CPU) with multiple data units (e.g., packetized data) corresponding to a first content stream and said first frame time being received by said CPU prior to multiple data units (e.g., packetized data) corresponding to a second content stream and said first frame time.

Method Embodiment 4

The method of method embodiment 1 further comprising: operating said graphics processing unit to perform sequential parallel processing on different sets of data units corresponding to the first frame time, each sequentially processed set of data units including one data unit from each of said first plurality of different content streams.

Method Embodiment 5

The method of method embodiment 4, wherein said first operation is an operation performed as part of a first frame decoding operation or a first frame encoding operation; and wherein said first set of data units are received data units corresponding to the first frame time.

Method Embodiment 6

The method of method embodiment 5, further comprising: detecting completion of decoding or encoding of data units corresponding to the first frame time; and transferring generated data units generated from processing data units corresponding to the first frame time, from the GPU output buffer to memory accessible to the CPU, following detecting completion of decoding or encoding of data units corresponding to the first frame time.

Method Embodiment 7

The method of method embodiment 5, wherein said step of operating the central processing unit to sequentially process at least some data units corresponding to different content streams and the first frame time includes: operating the central processing unit to sequentially implement commands received in different content streams (e.g., commands included in some of the received data units corresponding to the first frame time but different content streams).

Method Embodiment 8

The method of method embodiment 5, wherein operating said graphic processing unit to perform sequential parallel processing on different sets of data units corresponding to the first frame time includes: operating a second set of cores of the graphics processing unit, in parallel, to perform second processing on a second set of data units corresponding to the first frame time, said second processing including operating each core of the second set of cores to perform a second operation on a data unit, in the second set of data units, corresponding to a single one of the first plurality of content streams, each core in the second set of cores processing a data unit of a different content stream, said second processing generating a second set of generated data units.

Method Embodiment 9

The method of method embodiment 8, wherein said second set of cores includes the same number of cores as said first set of cores, cores in the second set being the same cores as the cores in the first set or different cores.

Method Embodiment 10

The method of method embodiment 5, further comprising: receiving, at a central processing unit, multiple data units corresponding to a second frame time for each of the first through Nth content streams; operating the central processing unit to sequentially process at least some data units corresponding to different content streams and the second frame time while said first set of cores of the graphics processing unit performs the first operation in parallel on the first set of data units.

Method Embodiment 11

The method of method embodiment 10, further comprising: supplying, a third set of data units corresponding to the first plurality of different content streams and the second frame time to the graphics processing unit; and operating a third set of cores of the graphics processing unit to perform a third operation in parallel on the data units in the third set of data units corresponding to the second frame time while said central processing unit processes data units corresponding to a third frame time.

Method Embodiment 12

The method of method embodiment 10, wherein the third set of data units is a subset of the multiple data units corresponding to the second frame time for each of the first through Nth content streams.

Method Embodiment 13

The method of method embodiment 1, wherein said first operation is a first decoding operation corresponding to a first standard; wherein the first set of generated data units generated by said parallel processing is a first set of decoded data units corresponding to the first plurality of content streams; and wherein the method further comprises: supplying the first set of decoded data units to a fourth set of processing cores of the graphics processing unit, said fourth set of processing cores including the same or different processing cores as the first and second processing cores of the graphics processing unit; and operating the fourth set of processing cores in parallel to perform an encoding operation on the first set of decoded data units corresponding to the first plurality of content streams.

Method Embodiment 14

The method of method embodiment 13, wherein said encoding operation is an encoding operation corresponding to a second standard which is different from said first standard.

Method Embodiment 15

The method of method embodiment 14, wherein said first decoding operation is performed within an amount of time equal to or less than an amount of time allowed by the first standard for decoding a frame and wherein said encoding operation is performed in an amount of time equal to or less than an amount of time allowed by the second standard for encoding a frame.

Method Embodiment 16

The method of method embodiment 15, wherein said first plurality of content streams is a plurality of voice content streams corresponding to different voice calls being communicated using data units in the form of packets.

List of First Set of Exemplary Numbered System Embodiments

System Embodiment 1

A communications system, the system comprising: a central processing unit (CPU) device including instructions which when executed control the CPU device to: receive multiple data units corresponding to a first frame time for each of first through Nth content streams (N being a positive integer number greater than 1); sequentially process at least some data units corresponding to different content streams and the first frame time; and control supplying, a first set of data units corresponding to a first plurality of different content streams to a graphics processing unit, each data unit of the first set of data units corresponding to a different content stream; and a graphics processing unit (GPU) device including instructions which when executed control the GPU device to: operate a first set of cores of the graphics processing unit, in parallel, to perform first processing on the first set of data units, said first processing including operating each core of the first set of cores to perform a first operation on a data unit corresponding to a single one of the first plurality of content streams, each core in the first set of cores processing a data unit of a different content stream, said first processing generating a first set of generated data units; and store the first set of generated data units in a graphics processing unit (GPU) output buffer.

System Embodiment 2

The system of system embodiment 1, wherein said multiple data units corresponding to the first frame time are received by the CPU sequentially, on a per stream basis.

System Embodiment 3

The system of system embodiment 2 wherein said multiple data units corresponding to the first frame time are received by the CPU from memory (e.g., RAM coupled to the CPU) with multiple data units (e.g., packetized data) corresponding to a first content stream and said first frame time being received by said CPU prior to multiple data units (e.g., packetized data) corresponding to a second content stream and said first frame time.

System Embodiment 4

The system of system embodiment 1 including additional instructions in said GPU which when executed by the GPU device control the GPU device to: perform sequential parallel processing on different sets of data units corresponding to the first frame time, each sequentially processed set of data units including one data unit from each of said first plurality of different content streams.

System Embodiment 5

The system of system embodiment 4, wherein said first operation is an operation performed as part of a first frame decoding operation or a first frame encoding operation; and wherein said first set of data units are received data units corresponding to the first frame time.

System Embodiment 6

The system of system embodiment 5, wherein said CPU is further operated to: detecting completion of decoding or encoding of data units corresponding to the first frame time; and transferring generated data units generated from processing data units corresponding to the first frame time, from the GPU output buffer to memory accessible to the CPU, following detecting completion of decoding or encoding of data units corresponding to the first frame time.

System Embodiment 7

The system embodiment of system embodiment 5, wherein said operating the central processing unit to sequentially process at least some data units corresponding to different content streams and the first frame time includes: operating the central processing unit to sequentially implement commands received in different content streams (e.g., commands included in some of the received data units corresponding to the first frame time but different content streams).

System Embodiment 8

The system of system embodiment 5, wherein operating said graphic processing unit to perform sequential parallel processing on different sets of data units corresponding to the first frame time includes:
operating a second set of cores of the graphics processing unit, in parallel, to perform second processing on a second set of data units corresponding to the first frame time, said second processing including operating each core of the second set of cores to perform a second operation on a data unit, in the second set of data units, corresponding to a single one of the first plurality of content streams, each core in the second set of cores processing a data unit of a different content stream, said second processing generating a second set of generated data units.

System Embodiment 9

The system of system embodiment 8, wherein said second set of cores includes the same number of cores as said first set of cores, cores in the second set being the same cores as the cores in the first set or different cores.

System Embodiment 10

The system of system embodiment 5, wherein said CPU includes further instructions which when executed operate the CPU to: receive, at a central processing unit, multiple data units corresponding to a second frame time for each of the first through Nth content streams; sequentially process at least some data units corresponding to different content streams and the second frame time while said first set of cores of the graphics processing unit performs the first operation in parallel on the first set of data units.

System Embodiment 11

The system of system embodiment 10, wherein said CPU includes additional instructions which when executed operate the CPU to: supplying, a third set of data units corresponding to the first plurality of different content streams and the second frame time to the graphics processing unit; and wherein the GPU includes additional instruction which when executed operate the GPU to: operating a third set of cores of the graphics processing unit to perform a third operation in parallel on the data units in the third set of data units corresponding to the second frame time while said central processing unit processes data units corresponding to a third frame time.

System Embodiment 12

The system of system embodiment 10, wherein the third set of data units is a subset of the multiple data units corresponding to the second frame time for each of the first through Nth content streams.

System Embodiment 13

The system of system embodiment 1, wherein said first operation is a first decoding operation corresponding to a first standard; wherein the first set of generated data units generated by said parallel processing is a first set of decoded data units corresponding to the first plurality of content streams; and wherein the GPU further includes instructions which when executed operate the GPU to: supply the first set of decoded data units to a fourth set of processing cores of the graphics processing unit, said fourth set of processing cores including the same or different processing cores as the first and second processing cores of the graphics processing unit; and operate the fourth set of processing cores in parallel to perform an encoding operation on the first set of decoded data units corresponding to the first plurality of content streams.

System Embodiment 14

The system of system embodiment 13, wherein said encoding operation is an encoding operation corresponding to a second standard which is different from said first standard.

System Embodiment 15

The system of system embodiment 14, wherein said first decoding operation is performed within an amount of time equal to or less than an amount of time allowed by the first standard for decoding a frame and wherein said encoding operation is performed in an amount of time equal to or less than an amount of time allowed by the second standard for encoding a frame.

System Embodiment 16

The system of system embodiment 15, wherein said first plurality of content streams is a plurality of voice content streams corresponding to different voice calls being communicated using data units in the form of packets.

The techniques of various embodiments may be implemented using software, hardware and/or a combination of software and hardware. Various embodiments are directed to apparatus, e.g., CPU and GPU devices. Various embodiments are also directed to methods, e.g., method of controlling and/or operating devices, e.g., CPU and GPU devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps or elements of the described methods.

In various embodiments each of the steps or elements of a method are implemented using one or more processors or processor cores. In some embodiments, each of the steps or elements are implemented using hardware circuitry.

In various embodiments nodes and/or elements described herein are implemented using one or more components to perform the steps corresponding to one or more methods, for example, signal processing, encoding, decoding, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., CPU devices, GPU devices, session border controller including CPU and GPU devices, including a processor or processing core configured to implement one, multiple or all of the steps of one or more methods of the invention.

In some embodiments, the processor or processors, e.g., CPUs and GPUs, of one or more devices, e.g., communications nodes such as session border controllers are configured to perform the steps of the methods described as being performed by the communications nodes, e.g., transcoding session border controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a session border controller that provides encoding, decoding and/or transcoding services, with a processor which includes a component corresponding to each of the steps of the various described methods performed by the device in which the processor is included. In some but not all embodiments a device, e.g., communications node such as a session border controller, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a session border controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU and/or GUP, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
receiving, at a central processing unit (CPU), multiple data units corresponding to a first frame time for each of first through Nth content streams, N being a positive integer number greater than 1;
operating the central processing unit to sequentially process at least some of said multiple data units corresponding to different content streams of the first through Nth content streams and the first frame time;
supplying a first set of data units, from the multiple data units corresponding to the first frame time, to a graphics processing unit, each data unit of the first set of data units corresponding to a different one of the first through Nth content streams;
supplying a second set of data units, from the multiple data units corresponding to the first frame time, to the graphics processing unit, each data unit of the second set of data units corresponding to a different one of the first through Nth content streams;

operating said graphics processing unit to perform sequential parallel processing on different sets of data units from the multiple data units corresponding to the first frame time, each sequentially processed set of data units including one data unit from each of a first plurality of different content streams, said first plurality of different content streams consisting of the first through Nth content streams, said operating said graphics processing unit to perform sequential parallel processing on different sets of data units including operating a first set of cores of the graphics processing unit, in parallel, to perform first processing on the first set of data units, said first processing including operating each core of the first set of cores to perform a first operation on a data unit corresponding to a single one of the first plurality of content streams, each core in the first set of cores processing a data unit of a different content stream, said first processing generating a first set of generated data units; and storing the first set of generated data units in a graphics processing unit (GPU) output buffer.

2. The method of claim 1, wherein said multiple data units corresponding to the first frame time are received by the CPU sequentially, on a per stream basis, data units corresponding to each content stream being received sequentially.

3. The method of claim 2 wherein said multiple data units corresponding to the first frame time are received by the CPU from memory with multiple data units corresponding to a first content stream and said first frame time being received by said CPU prior to multiple data units corresponding to a second content stream and said first frame time.

4. The method of claim 1, wherein operating said graphics processing unit to perform sequential parallel processing on different sets of data units corresponding to the first frame time further includes:

operating a second set of cores of the graphics processing unit, in parallel, to perform second processing on the second set of data units corresponding to the first frame time, said second processing including operating each core of the second set of cores to perform a second operation on a data unit, in the second set of data units, corresponding to a single one of the first plurality of content streams, each core in the second set of cores processing a data unit of a different content stream, said second processing generating a second set of generated data units.

5. A communications method, the method comprising:

receiving, at a central processing unit (CPU), multiple data units corresponding to a first frame time for each of first through Nth content streams, N being a positive integer number greater than 1;

operating the central processing unit to sequentially process at least some data units corresponding to different content streams and the first frame time, said received multiple data units including said at least some data units corresponding to different content streams and the first frame time;

supplying a first set of data units corresponding to a first plurality of different content streams to a graphics processing unit, each data unit of the first set of data units corresponding to a different content stream, said at least some data units corresponding to different content streams and the first frame time including said first set of data units;

operating said graphics processing unit to perform sequential parallel processing on different sets of data units corresponding to the first frame time, each sequentially processed set of data units including one data unit from each of said first plurality of different content streams, and wherein said operating said graphic processing unit to perform sequential parallel processing on different sets of data units corresponding to the first frame time includes operating a first set of cores of the graphics processing unit, in parallel, to perform first processing on the first set of data units, said first processing including operating each core of the first set of cores to perform a first operation on a data unit corresponding to a single one of the first plurality of content streams, each core in the first set of cores processing a data unit of a different content stream, said first processing generating a first set of generated data units; and storing the first set of generated data units in a graphics processing unit (GPU) output buffer.

6. The method of claim 5, wherein said first operation is an operation performed as part of a first frame decoding operation or a first frame encoding operation; and wherein said first set of data units are received data units corresponding to the first frame time.

7. The method of claim 6, further comprising:

detecting completion of decoding or encoding of data units corresponding to the first frame time; and transferring generated data units generated from processing data units corresponding to the first frame time, from the GPU output buffer to memory accessible to the CPU, following detecting completion of decoding or encoding of data units corresponding to the first frame time.

8. The method of claim 6, wherein said step of operating the central processing unit to sequentially process at least some data units corresponding to different content streams and the first frame time includes:

operating the central processing unit to sequentially implement commands received in different content streams.

9. The method of claim 6, wherein operating said graphic processing unit to perform sequential parallel processing on different sets of data units corresponding to the first frame time includes:

operating a second set of cores of the graphics processing unit, in parallel, to perform second processing on a second set of data units corresponding to the first frame time, said second processing including operating each core of the second set of cores to perform a second operation on a data unit, in the second set of data units, corresponding to a single one of the first plurality of content streams, each core in the second set of cores processing a data unit of a different content stream, said second processing generating a second set of generated data units.

10. The method of claim 9, wherein said second set of cores includes the same number of cores as said first set of cores, cores in the second set of cores being the same cores as the cores in the first set of cores or different cores.

11. The method of claim 6, further comprising:

receiving, at the central processing unit, multiple data units corresponding to a second frame time for each of the first through Nth content streams; and operating the central processing unit to sequentially process at least some data units corresponding to different content streams and the second frame time while said first set of cores of the graphics processing unit performs the first operation in parallel on the first set of data units.

12. A communications system, the system comprising:
a central processing unit (CPU) device including instructions which when executed control the CPU device to:
receive multiple data units corresponding to a first frame time for each of first through Nth content streams, N being a positive integer number greater than 1;
sequentially process at least some data units corresponding to different content streams and the first frame time, said received multiple data units including said at least some data units corresponding to different content streams and the first frame time; and
control supplying a first set of data units corresponding to a first plurality of different content streams to a graphics processing unit device, each data unit of the first set of data units corresponding to a different content stream, said at least some data units corresponding to different content streams and the first frame time including said first set of data units; and
wherein the graphics processing unit (GPU) device includes instructions which when executed control the GPU device to:
perform sequential parallel processing on different sets of data units corresponding to the first frame time, each sequentially processed set of data units including one data unit from each of said first plurality of different content streams, said perform sequential parallel processing on different sets of data units corresponding to the first frame time includes operating a first set of cores of the graphics processing unit, device in parallel, to perform first processing on the first set of data units, said first processing including operating each core of the first set of cores to perform a first operation on a data unit corresponding to a single one of the first plurality of content streams, each core in the first set of cores processing a data unit of a different content stream, said first processing generating a first set of generated data units; and
store the first set of generated data units in a graphics processing unit (GPU) output buffer.

13. The system of claim 12, wherein said multiple data units corresponding to the first frame time are received by the CPU device sequentially, on a per stream basis, data units corresponding to each stream being received sequentially.

14. The system of claim 13 wherein said multiple data units corresponding to the first frame time are received by the CPU device from memory with multiple data units corresponding to a first content stream and said first frame time being received by said CPU device prior to multiple data units corresponding to a second content stream and said first frame time.

15. The system of claim 12,
wherein said first operation is an operation performed as part of a first frame decoding operation or a first frame encoding operation; and
wherein said first set of data units are received data units corresponding to the first frame time.

16. The system of claim 15, wherein said CPU device is further operated to:
detect completion of decoding or encoding of data units corresponding to the first frame time; and
transfer generated data units generated from processing data units corresponding to the first frame time, from the GPU output buffer to memory accessible to the CPU device, following detecting completion of decoding or encoding of data units corresponding to the first frame time.

17. The system of claim 15, wherein said operating the central processing unit device to sequentially process at least some data units corresponding to different content streams and the first frame time includes:
operating the central processing unit device to sequentially implement commands received in different content streams.

18. The system of claim 15, wherein operating said graphic processing unit device to perform sequential parallel processing on different sets of data units corresponding to the first frame time includes:
operating a second set of cores of the graphics processing unit device, in parallel, to perform second processing on a second set of data units corresponding to the first frame time, said second processing including operating each core of the second set of cores to perform a second operation on a data unit, in the second set of data units, corresponding to a single one of the first plurality of content streams, each core in the second set of cores processing a data unit of a different content stream, said second processing generating a second set of generated data units.

19. The system of claim 18, wherein said second set of cores includes the same number of cores as said first set of cores, cores in the second set of cores being the same cores as the cores in the first set of cores or different cores.

20. The system of claim 15, wherein said CPU device includes further instructions which when executed operate the CPU device to:
receive, at the central processing unit device, multiple data units corresponding to a second frame time for each of the first through Nth content streams; and
sequentially process at least some data units corresponding to different content streams and the second frame time while said first set of cores of the graphics processing unit device performs the first operation in parallel on the first set of data units.

* * * * *